(12) United States Patent
Miyanishi et al.

(10) Patent No.: US 7,401,696 B2
(45) Date of Patent: Jul. 22, 2008

(54) FLEXIBLE TRANSFER INSTALLATION AND FOODSTUFF TRANSFER SYSTEM PROVIDED WITH THE FLEXIBLE TRANSFER INSTALLATION

(75) Inventors: Hideki Miyanishi, Tokyo (JP); Akira Sekino, Tokyo (JP); Hidenori Ishizaki, Tokyo (JP)

(73) Assignee: Mayekawa Mfg. Co., Ltd., Tokyo (JP)

( * ) Notice: Subject to any disclaimer, the term of this patent is extended or adjusted under 35 U.S.C. 154(b) by 0 days.

(21) Appl. No.: 10/511,896

(22) PCT Filed: Feb. 6, 2004

(86) PCT No.: PCT/JP2004/001275

§ 371 (c)(1),
(2), (4) Date: Jun. 20, 2005

(87) PCT Pub. No.: WO2005/075324

PCT Pub. Date: Aug. 18, 2005

(65) Prior Publication Data
US 2005/0224316 A1    Oct. 13, 2005

(51) Int. Cl.
B65G 17/00    (2006.01)
B65G 17/06    (2006.01)

(52) U.S. Cl. ................. 198/778; 198/728; 198/848; 198/822

(58) Field of Classification Search .......... 198/778, 198/848, 822, 728
See application file for complete search history.

(56) References Cited

U.S. PATENT DOCUMENTS

| | | | | |
|---|---|---|---|---|
| 3,783,777 A | * | 1/1974 | Killen et al. | 101/40 |
| 5,228,557 A | * | 7/1993 | Lago | 198/778 |
| 5,277,301 A | * | 1/1994 | Fenty | 198/778 |

FOREIGN PATENT DOCUMENTS

| | | |
|---|---|---|
| JP | 5-9133106 | 7/1984 |
| JP | 7-025407 | 3/1995 |
| JP | 7-100524 | 11/1995 |

* cited by examiner

Primary Examiner—Gene O. Crawford
Assistant Examiner—Kavel P Singh
(74) Attorney, Agent, or Firm—Crowell & Moring LLP

(57) ABSTRACT

The present invention is featured in that a plurality of transfer pieces composing a transfer conveyer are connected to be able to be piled vertically spirally, the transfer pieces having pairs of spacer members each of which is formed to have an inside-part and an outside part continuing to the inside-part and offsetting outward in lateral direction perpendicular to the transfer direction, an engaging part having a contact face extending in the direction parallel to the transfer direction being formed at the upper and lower end part of the outside-part of the spacer member; the transfer pieces can be piled such that vertically adjacent spacer members contact to each other with the contact face of the upper and lower engaging part; an inside chain and an outside chain are provided for allowing the inner side and outer side spacer members to ride on respective chain to advance the transfer conveyer; and the inside chain and outside chain are driven by a single motor.

6 Claims, 18 Drawing Sheets

FIG. 16
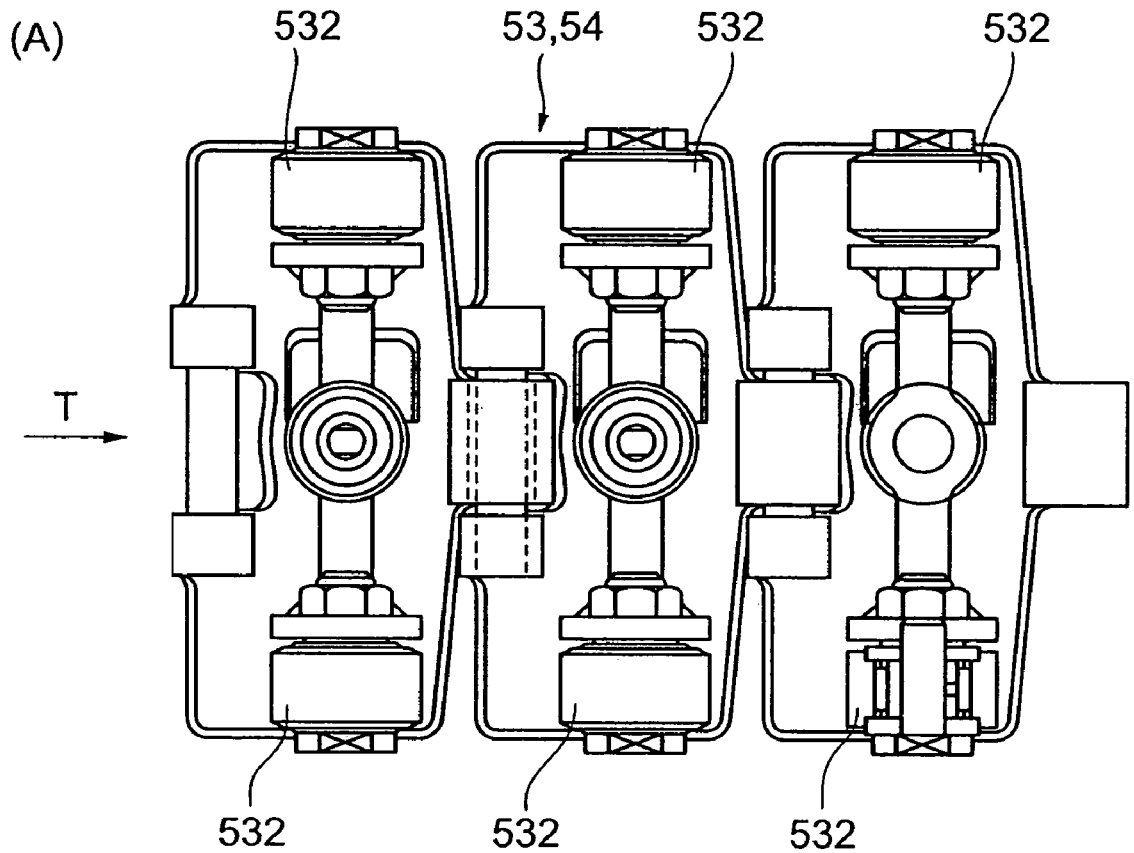
(A)
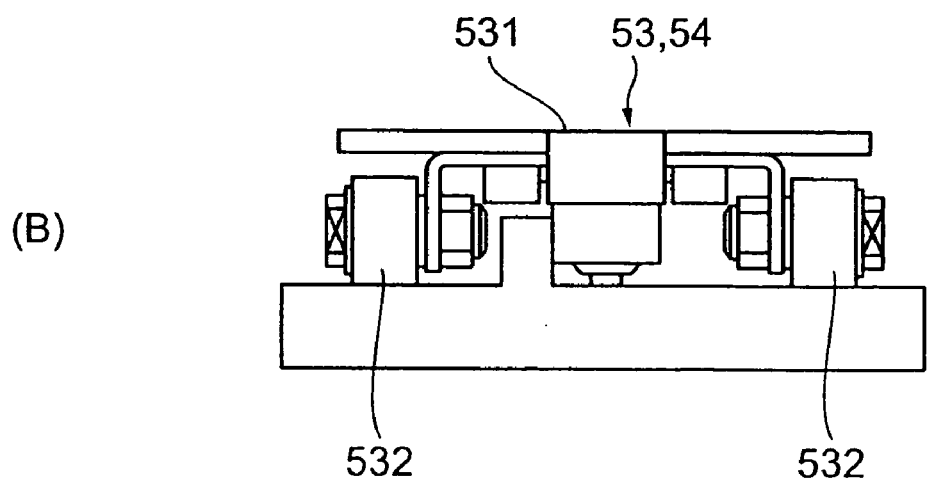
(B)

— Inside chain
+++++++ Outside chain

FLEXIBLE TRANSFER INSTALLATION AND FOODSTUFF TRANSFER SYSTEM PROVIDED WITH THE FLEXIBLE TRANSFER INSTALLATION

TECHNICAL FIELD

The present invention relates to a flexible transfer installation applied to a spirally piled endless conveyer, etc. for transferring frozen foodstuff in a refrigeration room, the conveyer being composed of a plurality of transfer pieces connected to be capable of moving relative to each other along the transfer direction, each of the transfer piece being composed of a pair of spacer members and connection members which constitute a transfer passage of frozen foodstuff, etc., the spacer members being fixed to both end sides of the connection members; and to a foodstuff transfer system provided with the flexible foodstuff transfer installation.

BACKGROUND ART

Endless transfer conveyers for transferring frozen foodstuff in refrigeration rooms are disclosed in Japanese Patent Publication No. 7-100524 (prior art 1), No. 7-25407 (prior art 2), and No. 1-44605 (prior art 3). Each of the conveyers comprises a plurality of transfer pieces connected to be capable of moving relative to each other along the transfer direction to constitute a transfer passage of frozen foodstuff, etc., the transfer piece being composed of connection members and flat spacer members erecting on both sides of the connection members, and the plurality of transfer pieces are piled spirally vertically such that the lower end of a transfer piece in the spiral pile rides on the upper end of a transfer piece positioned right under said transfer piece vertically adjacent thereto.

FIG. 18 is an outside view of the spirally piled endless transfer conveyer disclosed in said prior arts. In the drawing, reference numeral 100 is a spirally piled transfer conveyer comprising transfer pieces 010, each transfer piece being composed of connection members 02 with flat spacer members provided to erect on both sides of the connection members 02.

Particularly in prior art 1 among said prior arts, the transfer conveyer comprises a plurality of transfer pieces for forming a transfer passage, each of the transfer piece is composed of connection members with flat spacer members attached to stand upright on both sides of the connection members and connected to each other to be capable of moving along the transfer direction, and each of the flat spacer members is formed to have an inside-part and an outside-part continuing to the inside-part and offsetting from the inside-part outward in a lateral direction perpendicular to the transfer direction. The lower end part of the outside-part of the spacer member is bent outward to form an outwardly inclined part, and the lower end part of the inside-part of the spacer is bent inward to form an inwardly inclined part. Therefore, the upper end of a spacer member in the spiral is guided by the outwardly inclined part and inwardly inclined part of a spacer member positioned right under said spacer member and lateral movement of the spacer member in lateral directions perpendicular to the transfer direction is restrained. Thus, the plurality of transfer pieces can be piled vertically spirally with the occurrence of lateral movement of the transfer pieces in lateral directions perpendicular to the transfer direction prevented.

However, in prior art 1, as the upper end of the outside-part of the spacer member contacts the outwardly inclined face in line contact, there occurs high contact pressure which causes a problem that wear will be generated due to the high contact pressure.

Further, in prior art 1, the upper end of the outside-part of a spacer member is guided by the outwardly inclined part of the outer-side of the spacer member positioning right above, the upper end of the inside-part of a spacer member is guided by the inwardly inclined part of the spacer member positioning right above, and the position of the outwardly inclined part is different from that of the inwardly inclined part in the direction along the transfer direction, so that variation in engagement is apt to occur for each spacer member, which induces zig.zag motion of each of the transfer pieces, that is, each of the transfer pieces travel wobbling right and left. As a result, it is difficult to secure stable operation of the transfer conveyer when the transfer pieces are piled in a spiral.

Still further, in prior art 1, as the spacer member is formed to have an outwardly inclined part at the lower end part of the outside-part thereof and an inwardly inclined part at the lower end of the inside-part thereof, processing man-hour of the spacer member increases and also assembling man-hour increases to engage the upper end of the spacer member with the inclined parts formed in the lower end part of the spacer member right above in the spiral, resulting in an increase manufacturing and assembling cost of the transfer conveyer.

In prior art 1 and 2, as the surface of the connection members of the transfer pieces to form the transfer passage contact the surface of driving members such as a drive roller, drive chain, etc., there may occur a sanitary problem when foodstuff is transferred.

Further, in prior art 1 and 2, the inside chain for driving the inner side of the transfer conveyer and the outside chain for driving the outer side of the transfer conveyer are driven by separate motors, and rotation speed of each motor is controlled separately. Therefore, two motors and associated parts are needed to drive the transfer conveyer. As a result, the driving apparatus for driving the chains becomes complicated resulting in an increased price.

Still further, in prior art 1 and 2, each motor for driving the transfer conveyer is installed vertically, the height of the driving apparatus is increased and its maintainability is not good for the speed change gear drive and motor is installed vertically.

As mentioned above, there are several problems to be solved in the prior arts.

DISCLOSURE OF THE INVENTION

The present invention was made in light of the problems of prior art. The object of the invention is to provide a flexible transfer installation provided with a transfer conveyer which is flexible in the transfer direction, the transfer pieces of the conveyer being able to be piled in a vertical spiral without the occurrence of lateral movement of the transfer pieces in lateral directions perpendicular to the transfer direction, of which the transfer pieces are composed so that the contact portion of the transfer pieces contacting to each other when piled in a vertical spiral is highly resistant to wear, and which is compact in construction and produced with decreased man-hour resulting in decreased manufacturing cost by simplifying the structure of the spacer member of the transfer piece to reduce the processing man-hour of the spacer member; and to provide a foodstuff transfer system provided with the flexible transfer installation.

Another object of the invention is to provide a flexible transfer installation of compact construction, of low cost, and superior in maintainability, in which the driving apparatus of the flexible installation is composed and located such that the component parts of the driving apparatus do not contact the surface of the connection members constituting the transfer passage in order to perform hygienic operation, and to provide a foodstuff transfer system provided with the flexible transfer installation.

The present invention proposes to achieve the above-mentioned objects a flexible transfer installation in which a transfer conveyer is composed such that, a plurality of transfer pieces each comprising a pair of erect flat spacer member connected to both end sides of connection members which constitute a transfer passage of articles including foodstuff are connected to each other to be capable of moving in the direction of transfer relative to each other, and said transfer pieces can be piled in a vertical spiral by allowing an upper side positioned spacer member to rise on a spacer member positioned right under said upper side positioned spacer member; wherein said spacer member is formed to have an inside-part and an outside-part continuing to said inside-part and offsetting from the inside-part outward in lateral direction perpendicular to the transfer direction, an engaging part extending in a lateral direction perpendicular to the transfer direction and having a contact face is formed at the upper end part and lower end part of the outside-part of the spacer member, and the lower engaging part of a spacer member rises on the upper engaging part of a vertically downwardly adjacent spacer to be supported via the contact face of each engaging part.

In the invention, it is preferable that the outside end part of each of said upper engaging part and lower engaging part is bent to form an inclined part inclined by a certain angle to the vertical direction so that the movement of the transfer piece in lateral directions perpendicular to the transfer direction can be retained.

According to the invention, the spacer member of the transfer piece is formed to have an inside-part and an outside-part continuing to the inside part and offsetting from the inside-part outward in lateral direction perpendicular to the transfer direction, an engaging part is formed to the upper and lower end part of the outside-part, the engaging part having a contact face extending along to the transfer direction, and a plurality of transfer pieces can be piled vertically by allowing the lower engaging part of the transfer piece to contact the upper engaging part of a downwardly adjacent transfer piece by plane contact, so that the load exerting to the transfer pieces can be carried by plane contact resulting in a reduced contact pressure. Therefore, resistant to wear of the contacting parts of the transfer pieces is superior compared with the prior art wherein the load is born by line contact.

Further, the load exerting to the transfer pieces is carried by plane contact between the lower and upper engaging part as mentioned above, and at the same time the transfer pieces can be restrained from moving laterally in lateral directions perpendicular to the transfer direction by the engagement of the inclined parts formed at the outside end part of each of the upper and lower engaging part inclining by a certain angle to the vertical direction.

With the composition as mentioned above, the transfer pieces are steadily kept in vertical position by the plane contact and the occurrence of lateral movement of the transfer piece in lateral directions perpendicular to the transfer direction is prevented by the inclined part. Therefore, a vertical spiral pile of the transfer conveyer can be formed while keeping good stability.

Therefore, according to the present invention, it is not needed to form an engaging part to the end part of each of the inside-part and outside-part of the spacer member such that one is formed to bend for example outward and the other to bend inward perpendicular to the transfer direction as is the case with the prior art, but a transfer conveyer having the feature as mentioned above can be obtained by forming the engaging part having a contact face extending along the transfer direction and an inclined face inclining upward from the contact face is formed only to the outside-part of the spacer member at each of the upper and lower end part thereof.

By this, the structure of the spacer member is simplified resulting in a decreased processing man-hour, and manufacturing cost of the transfer conveyer and further the manufacturing cost of a refrigeration system integrating the transfer conveyer can be reduced. The transfer conveyer can be used as a downward advancing conveyer in the spiral portion without particular doctoring.

Further, in the invention, it is preferable that both end parts of said bar-like connection members are fixed to the outside-part of said pair of spacer members, an oblong hole of a certain length along the transfer direction is made in the inside-part of said pair of spacer members, and both end parts of one of said connection members are passed through the oblong holes to be movable relative to the pair of spacer members so that each transfer piece can move relative to each other in the transfer direction due to loose fitting of the connection member in the oblong holes.

By the composition like this, a transfer conveyer flexible in the transfer direction can be obtained by enabling the transfer pieces to move relative to each other in the transfer direction with simple construction simple that both end parts of the bar-like connection members are fixed to the outside-part of the pair of spacer members and one of the connection members is fitted loosely in the oblong holes each made in the inside-part of each spacer member to be able to move relative to the holes, and the manufacturing cost of the transfer conveyer is reduced.

In the invention, it is preferable that both end parts of said bar-like connection members are fixed to the outside-part of said pair of spacer members, both end sides of one or some of the connection members are extended beyond the fixed parts to be bent upward, and the end of the extended portion is bent in the horizontal direction to be fixed to the upper engaging part of the outside-part of the spacer member to reinforce the spacer member and at the same time to form a guide part to be guided along support members provided on both sides of the transfer conveyer at a plurality of positions.

By composing like this, as both end parts of one or some among the connection members connecting the pair of the spacer member are extended to form guide parts to serve both as guide members and connection members, the transfer conveyer can be advanced steadily without sideway movement, and there is no need to provide exceptional guide members to the transfer conveyer.

Further, as the end part of the extension part of the connection member is bent to be fixed to the inclined part of the spacer member, the spacer member is reinforced by the extension part of the connection member, the vertical load is born by the reinforced engaging part not by the connection members connecting the spacer members and constituting the transfer passage as is the case with the prior art, so a transfer conveyer high in strength and hygienic in transferring frozen foodstuff can be obtained.

The present invention proposes as a foodstuff transfer system adopting the flexible transfer installation of the invention for transferring frozen foodstuff, etc. a foodstuff transfer system provided with a flexible transfer installation having a transfer conveyer which is composed of a plurality of transfer pieces each comprising a pair of erect flat spacer members connected to both end sides of connection members which constitute a transfer passage of foodstuff are connected to each other to be capable of moving in the direction of transfer relative to each other, wherein said spacer member is formed to have an inside-part and an outside-part continuing to said inside-part and offsetting from the inside-part outward in direction perpendicular to the transfer direction, an engaging part extending in a lateral direction perpendicular to the transfer direction and having a contact face is formed at the upper end part and lower end part of the outside-part of the spacer member, a spiral pile of the transfer conveyer is formed by piling the transfer pieces vertically along a spiral by allowing the lower engaging part of a spacer member to rise on the upper engaging part of a vertically downwardly adjacent spacer to be supported via the contact face of each engaging part, the spirally piled transfer conveyer is accommodated in a heat insulated room, and an endless transfer conveyer is composed by connecting the entrance and way-out of the transfer conveyer to and from the heat insulated room.

By the invention applying the flexible transfer installation for a foodstuff transfer system for transferring frozen foodstuff, etc., the transfer pieces composing the transfer conveyer are piled in plane contact and the contact pressure due to the load exerting to the transfer pieces can be reduced resulting in a transfer conveyer with superior wear resistance, and the lateral movement in lateral directions perpendicular to the transfer direction can be restrained by the inclined part formed bending outward at the end part of the engaging part of the transfer piece.

Thus, a foodstuff transfer conveyer for frozen foodstuff, etc. composed of transfer pieces piled spirally vertically can be obtained, in which vertical position of each transfer piece is retained by the plane contact and each transfer piece is prevented from laterally moving in lateral directions perpendicular to the transfer direction by the inclined part.

Further, as the engaging part extending laterally in a lateral direction perpendicular to the transfer direction is formed at the upper and lower end part respectively of the outside-part of the spacer member and the vertically adjacent transfer pieces contact to each other at the horizontal contact face of the upper and lower engaging part to form the spiral pile, there is not formed a pocket at the contacting portion of the transfer pieces 01 as is with the case of the prior art, drainage of water when transferring frozen foodstuff is improved.

In the invention, it is preferable that a refrigerating machine is installed in the space formed inside the spiral of the spirally piled transfer conveyer.

By composing like this, the cylindrical space formed inside the spiral pile of the transfer conveyer can be utilized as the space for installing the refrigerating machine, a compact refrigeration system can be realized.

Further, the present invention proposes a flexible transfer installation in which a transfer conveyer is composed such that, a plurality of transfer pieces each comprising a pair of erect flat spacer member connected to both end sides of connection members which constitute a transfer passage are connected to each other to be capable of moving in the direction of transfer relative to each other, and said transfer pieces can be piled in a vertical spiral by allowing an upper side positioned spacer member to rise on a spacer member positioned right under said upper side positioned spacer member; wherein said spacer member is formed to have an inside-part and an outside-part continuing to said inside-part and offsetting from the inside-part outward in lateral direction perpendicular to the transfer direction, and an engaging part is formed at the upper or lower end part of the inside-part and outer-side part, the engaging parts bending oppositely to each other in lateral direction perpendicular to the transfer direction so that the upper part and lower part of the spacer members adjacent to each other in the vertical direction can contact with each other.

In the invention, it is preferable that the engaging part of the inside-part and outside-part of the spacer member is respectively formed to have an inclined part inclined by a certain angle to the flat plane of the spacer member so that the movement of the transfer piece in lateral directions perpendicular to the transfer direction can be restrained.

Further, in the invention, it is preferable that both end parts of said bar-like connection members are fixed to the outside-part of said pair of spacer members, an oblong hole of a certain length along the transfer direction is made in the inside-part of said pair of spacer members, and both end parts of one of said connection members are passed through the oblong holes to be movable relative to the pair of spacer members so that each transfer piece can move relative to each other in the transfer direction by loose fitting of the connection member in the oblong holes.

According to the invention, each of the spacer member fixed to the both end sides of the connection members constituting the transfer passage is formed to have an inside-part and an outside-part continuing to the inside-part and offsetting to outside in lateral direction perpendicular to the transfer direction, an engaging part bending in a lateral direction perpendicular to the transfer direction is formed at the upper end part of the inside-part of the spacer member for example and an engaging part bending in a lateral direction perpendicular to the transfer direction but opposite to that of the engaging part formed at the upper end part of the inside-part is formed at the lower end part of the outside-part of the spacer member, the lower end of the inside-part of the spacer member contacts the upper engaging part formed at the upper end part of the inside-part of the spacer member positioning right under, and the lower engaging part formed at the lower end part of the outside-part of the spacer member contacts the upper end of the outside-spacer positioning right under.

As mentioned above, an engaging part is formed at the upper end part of the inside-part or outside-part of the spacer member bending in a lateral direction perpendicular to the transfer direction and an engaging part formed at the lower end part of the outside-part or inside part of the spacer member bending in a lateral direction perpendicular but opposite to the direction of the upper engaging part, and the upper and lower end of vertically adjacent spacer members contact the engaging parts, so the transfer conveyer can be piled vertically without permitting the spacer members to movement laterally in lateral directions perpendicular to the transfer direction.

Therefore, according to the invention, it is not needed to form an engaging part to the end part of each of the inside-part and outside-part of the spacer member such that one is formed to bend for example outward and the other to bend inward perpendicular to the transfer direction as is the case with the prior art, but the engaging part having a contact face extending along the transfer direction and an inclined face inclining upward from the contact face is formed only to the outside-part of the spacer member at each of the upper and lower end part thereof to obtain a transfer conveyer having the feature as mentioned above. By this, the structure of the spacer member is simplified resulting in a decreased processing man-hour, and manufacturing cost of the transfer conveyer and further the manufacturing cost of a refrigeration system integrating the transfer conveyer can be reduced.

Further, by inclining the engaging part of the spacer member by a certain angle to the flat face of the spacer member, the occurrence of lateral movement of the transfer pieces between the transfer pieces adjacent along the transfer direction in lateral directions perpendicular to the transfer direction can be positively prevented.

Further, a transfer conveyer flexible in the transfer direction can be obtained by enabling the transfer pieces to move relative to each other in the transfer direction by simple construction that both end parts of the bar-like connection members are fixed to the inside-part of the pair of spacer members and one of the connection members is fitted loosely in the oblong holes each made in the inside-part of each spacer member to be able to move relative to the holes, and the manufacturing cost of the transfer conveyer is reduced.

The present invention proposes as a foodstuff transfer system adopting the flexible transfer installation of the invention for transferring frozen foodstuff, etc. a foodstuff transfer system provided with a flexible transfer installation having a transfer conveyer which is composed of a plurality of transfer pieces each comprising a pair of erect flat spacer members connected to both end sides of connection members which constitute a transfer passage of foodstuff are connected to each other to be capable of moving in the direction of transfer relative to each other, wherein said spacer member is formed to have an outside-part and an inside-part continuing to said inside-part and offsetting from the inside-part outward in lateral direction perpendicular to the transfer direction, an engaging part is formed at the upper or lower end part of the inside-part and outer-side part, the engaging parts bending oppositely to each other in lateral direction perpendicular to the transfer direction so that the upper part and lower part of the spacer members adjacent to each other in the vertical direction can contact with each other, a spiral pile of the transfer conveyer is formed by piling the transfer pieces vertically along a spiral by allowing the lower engaging part of a spacer member to rise on the upper engaging part of a vertically downwardly adjacent spacer to be supported via the contact face of each engaging part, the spirally piled transfer conveyer is accommodated in a heat insulated room, and an endless transfer conveyer is composed by connecting the entrance and way-out of the transfer conveyer to and from the heat insulated room.

In the invention, it is preferable that a refrigerating machine is installed in the space formed inside the spiral of the spirally piled transfer conveyer.

By the invention applying the flexible transfer installation for a foodstuff transfer system for transferring frozen foodstuff, etc., the transfer pieces composing the transfer conveyer are piled in plane contact and the contact pressure due to the load exerting to the transfer pieces can be reduced resulting in a transfer conveyer with superior wear resistance, and the lateral movement in lateral directions perpendicular to the transfer direction can be restrained by the inclined part formed bending outward at the end part of the engaging part of the transfer piece.

Thus, a foodstuff transfer conveyer for frozen foodstuff, etc. composed of transfer pieces piled spirally vertically can be obtained, in which vertical position of each transfer piece is retained by the plane contact and each transfer piece is prevented from laterally moving in lateral directions perpendicular to the transfer direction by the inclined part.

Further, as the engaging part extending laterally in direction perpendicular to the transfer direction is formed at the upper and lower end part respectively of the outside-part of the spacer member and the vertically adjacent transfer pieces contact to each other at the horizontal contact face of the upper and lower engaging part to form the spiral pile, there is not formed a pocket at the contacting portion of the transfer pieces as is with the case of the prior art, drainage of water when transferring frozen foodstuff is improved.

Further, it is preferable that a plurality of transfer pieces each comprising a pair of erect flat spacer member connected to both end sides of connection members which constitute a transfer passage of articles including foodstuff are connected to each other to be capable of moving in the direction of transfer relative to each other, and said transfer pieces can be piled in a vertical spiral by allowing an upper side positioned spacer member to rise on a spacer member positioned right under said upper side positioned spacer member; wherein each spacer member has a contact face extending along the transfer direction at the lower end thereof, an inside chain to allow one of the pair of the spacer members riding on the inside chain to move together with the inside chain and an outside chain to allow the other of the pair of the spacer members riding on the outside chain to move together with the outside chain are provided, each of the spacer members contacting the chain with said contact face, and the inside chain and outside chain are driven by a single motor.

It is also preferable that said transfer conveyer is guided looping over guide pulleys from the way-out of the spiral pile to the portion where the transfer conveyer rides on the inside chain and outside chain to be advanced to the spiral pile, whereby the pair of spacer members contact the outer periphery of the pulleys.

According to the invention, the pair of spacer members fixed to both end sides of the connection members constituting the transfer passage of articles including foodstuff rides on the inside chain and outside chain driven by a single motor via the drive shaft while contacting each chain with the contact face of the lower end of each spacer member, and the transfer pieces having enough strength riding on the inside chain and outside chain driven by the motor are advanced by the contact of the transfer pieces with the inside chain and outside chain.

The transfer conveyer run out of the spiral pile is returned to the entrance part for entering the spiral to be ridden on the inside chain and outside chain, advancing looped over the intermediate pulleys, whereby the pair of spacer members fixed to both end sides of the connection members constituting the transfer passage contact the outer peripheries of the pulleys.

Therefore, the connection members constituting the transfer passage do not contact the driving components all over its length and sanitary transfer of foodstuff is possible. As the transfer conveyer is driven by the contact of the spacer members formed to have enough rigidity with the drive chains, the transfer conveyer can be advanced steadily.

In the invention, it is preferable that said inside chain and outside chain are looped respectively over an inside sprocket and an outside sprocket driven by said single motor, the chains being composed to be an endless chain respectively to allow the transfer pieces to be advanced to the spiral and then to return to the sprockets, a speed change gear drive is mounted between the inside sprocket and outside sprocket to reduce the rotation speed of the inside sprocket to be slower than the rotation speed of the outside sprocket, and the axes of rotation shafts to drive the sprockets are disposed horizontally.

It is preferable that the ratio of number of teeth of the inside gear connected to the inside sprocket to that of the outside gear connected to the outside sprocket is determined to coincide with the ratio of the curvature radius of the outside chain route at the outside sprocket to that of the inside chain route at the inside sprocket.

By composing like this, the inside chain and outside chain composed to be an endless chain respectively are looped respectively over the inside sprocket and outside sprocket connected to the speed change gear drive and driven by a single motor, the speed change gear drive being mounted between the inside sprocket and outside sprocket so that the rotation speed of the inside sprocket is reduced to be slower than that of the outside sprocket, so that the inside chain and outside chain composed as an endless chain respectively can be driven by a single motor and the inside chain and outside chain to be driven with advancing speed different to each other because of difference in curvature radius can be smoothly advanced.

Therefore, the inside chain and outside chain are driven by a single motor and the inner side spacer members and outer side spacer members of the transfer conveyer can be moved simultaneously with a proper speed ratio, the structure of the driving apparatus of the transfer conveyer becomes simple, and it becomes possible to install the motor outside the insulated room and connect the motor to the driving device to drive the transfer conveyer by means of the drive shaft. As a result, sanitary operation can be maintained.

Further, as the rotation axes of the drive shafts of the speed change gear drive to drive the inside chain and outside chain are disposed horizontal and parallel to the connection members of the transfer conveyer, the motor connected to the end of the drive shaft is disposed parallel to the transfer conveyer, and the height of the driving apparatus is substantially lowered compared with the prior art in which the motor is installed vertically. In addition, maintainability of the apparatus is increased, for the speed change gear drive and motor are installed horizontally.

Further, in the invention, it is preferable that the inside chain and outside chain are composed to be chains deformable in the directions perpendicular to the direction along the transfer direction of the transfer passage.

With this composition of the chains, the chains can be advanced while curving freely horizontally to allow the transfer conveyer to form the spiral pile.

In the invention, it is preferable that tension pulleys each to be looped over by the inside chain and outside chain and tension springs each to pull each tension pulley to exert tension are provided for tensioning the chains.

By this, the inside chain and outside chain composed as an endless chain respectively can be properly tensioned by means of the pulleys and tension springs, by which the occurrence of slack in the inside chain and outside chain is evaded and the transfer conveyer can be steadily advanced.

In the invention, it is preferable that the transfer conveyer is accommodated in an insulated room provided with a refrigerating machine and the motor is installed outside the insulated room. By composing like this, it can be evaded to install a driving apparatus such as a motor, etc. inside an insulated room provided with a refrigerating machine in which good hygiene should be maintained.

BRIEF DESCRIPTION OF THE DRAWINGS

FIG. 16(A) is a plan view of a part of the top chain, and FIG. 16(B) is a view in the direction of T in FIG. 16(A).

BEST MODE FOR EMBODIMENT OF THE INVENTION

A preferred embodiment of the present invention will now be detailed with reference to the accompanying drawings. It is intended, however, that unless particularly specified, dimensions, materials, relative positions and so forth of the constituent parts in the embodiments shall be interpreted as illustrative only not as limitative of the scope of the present invention.

Figure 6:
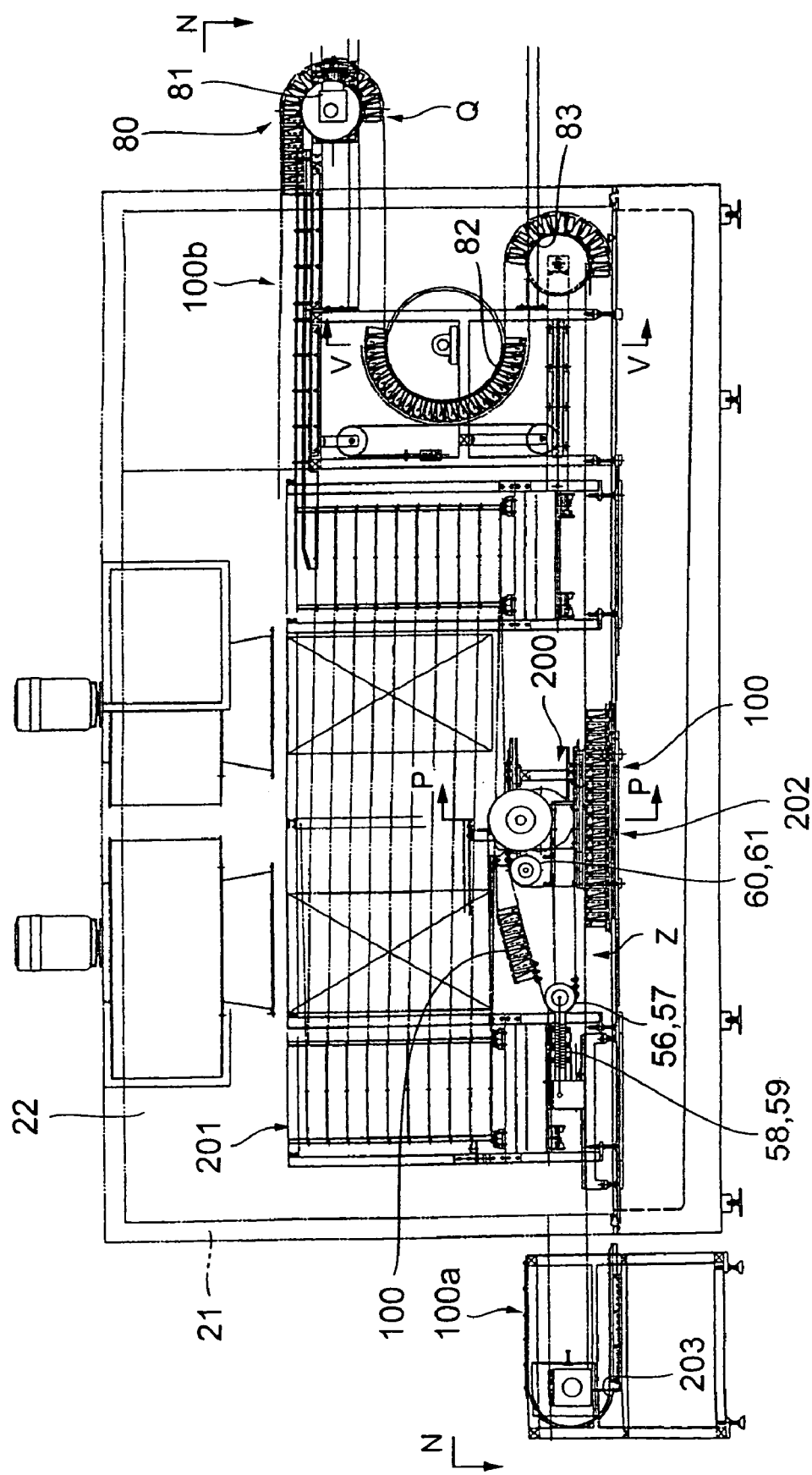
FIG. 6 is a side elevation of an embodiment of the transfer conveyer according to the present invention.

Referring to FIG. 6, 7 showing an embodiment of the transfer conveyer of the present invention, reference numeral 22 is a refrigeration room surrounded with a heat insulation wall 21, 100 is a transfer conveyer provided in the refrigeration room 22 for transferring frozen foodstuff.

The transfer conveyer 100 comprises a plurality of transfer pieces 01 (see FIG. 1) connected to be capable of moving relative to each other along the transfer direction so that the pieces can be piled vertically to form a spiral pile. The transfer conveyer 100 advancing straight and horizontally at an entrance portion 100a enters the refrigeration room 22, then advances forming a vertical spiral pile 201 upward, and advances again straight and horizontally from the top of the spiral at a way out portion 100b and leaves the refrigeration room 22.

Figure 7:
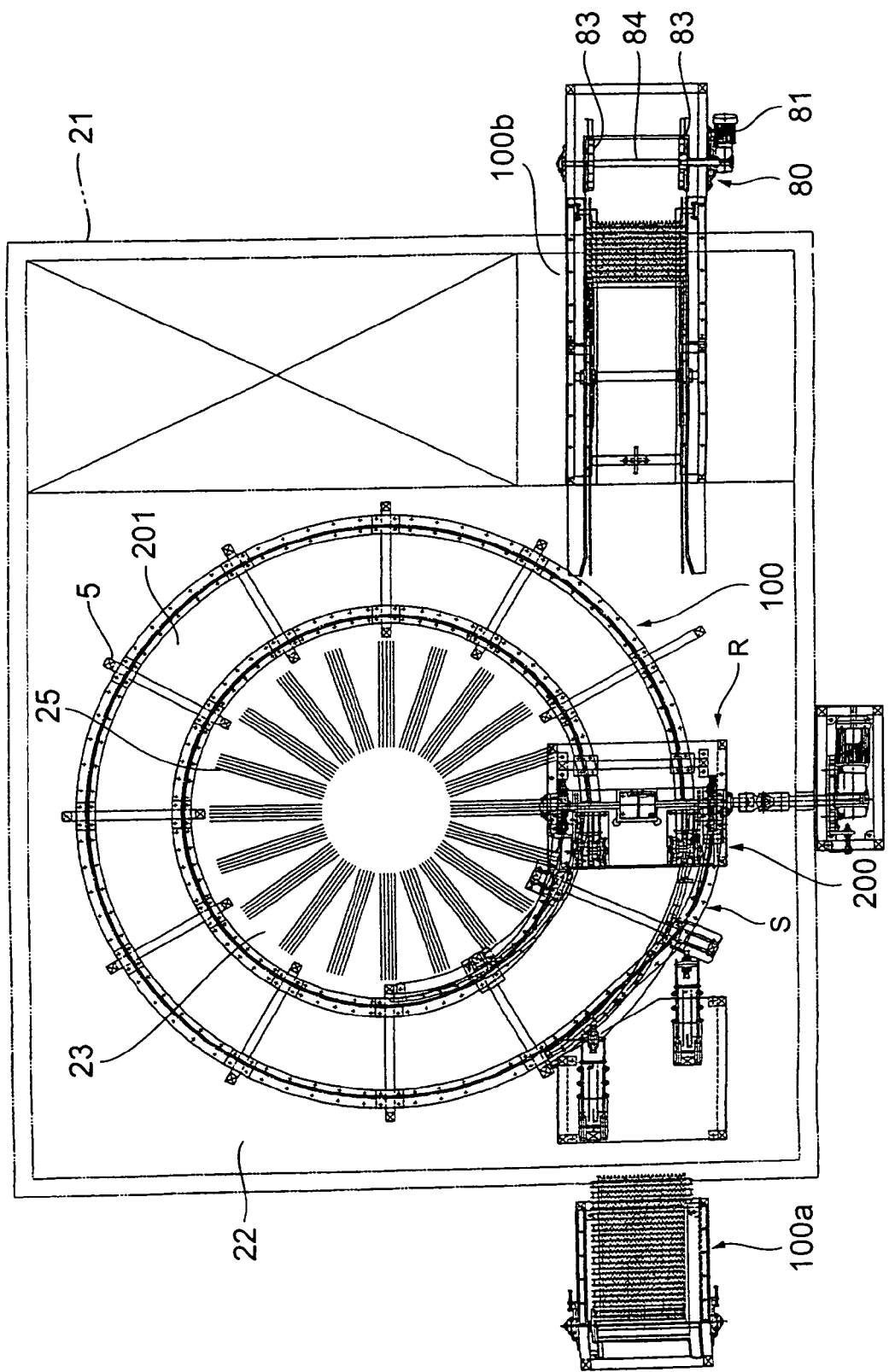
FIG. 7 is a plan view of an embodiment of the transfer conveyer according to the present invention.

The transfer conveyer is composed as an endless conveyer so that frozen foodstuff is placed on the transfer passage of the conveyer in the refrigeration room 22, the transfer passage being formed by connection members 2 as mentioned later, to transfer the frozen foodstuff to the outside of the room and foodstuff to be frozen is placed on the transfer passage of the conveyer advancing in the outside of the room to be transferred into the refrigeration room 22. In FIG. 7, reference numeral 5 are supporting frames for supporting the transfer conveyer 100 in the spiral pile.

The transfer conveyer 100 entered the refrigeration room 22 rides on chains, to be more specific, the spacer members 1 connected to both sides of the connection members 2, the space members and connection members composing a transfer piece 01 to constitute the transfer conveyer, rise on an inside chain 54 and an outside chain 53 in a driving apparatus 200 and move together with the inside chain 54 and outside chain 53.

Figure 9:
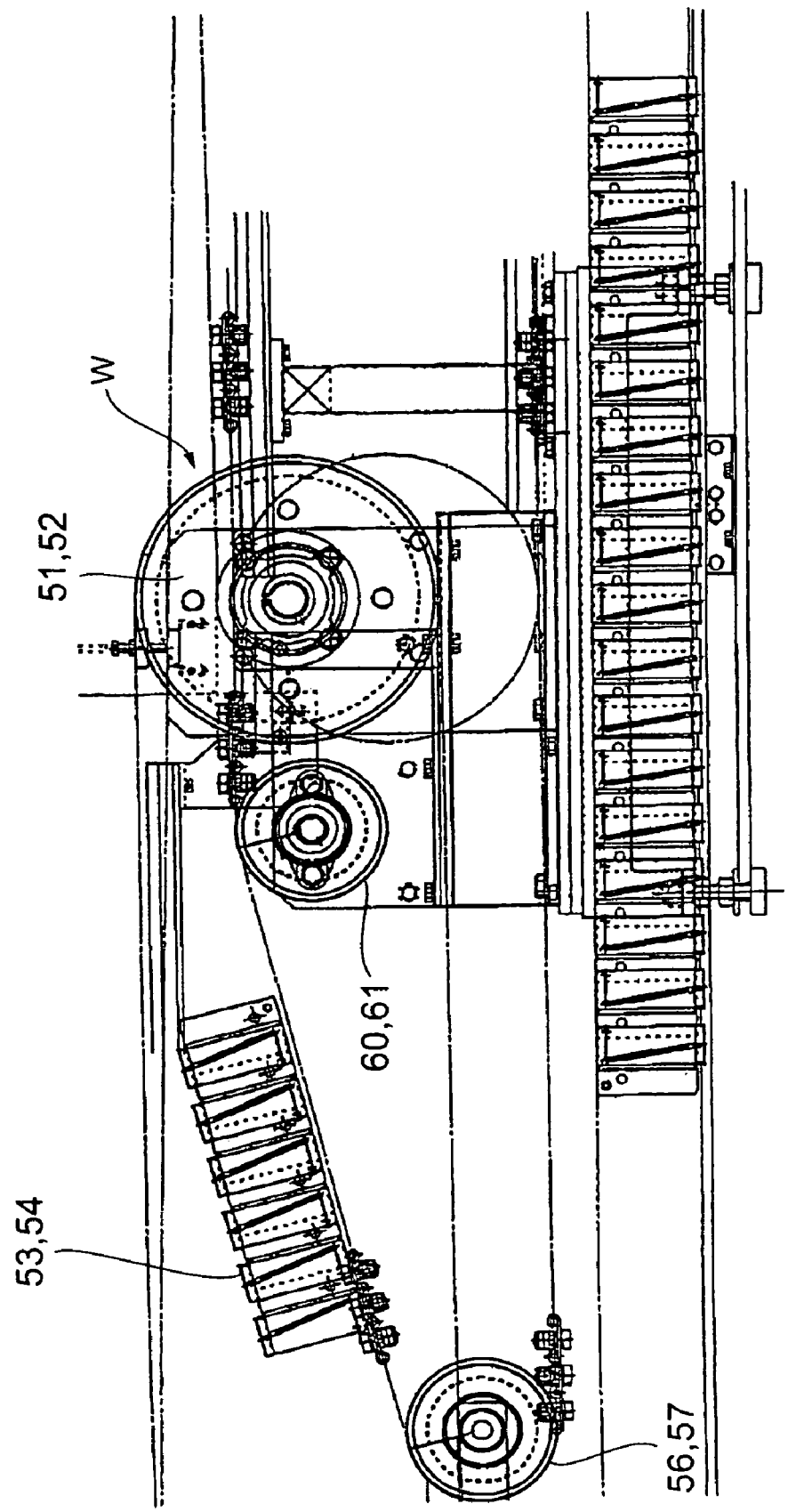
FIG. 9 is an enlarged detail of the part Z in FIG. 6.
Figure 10:
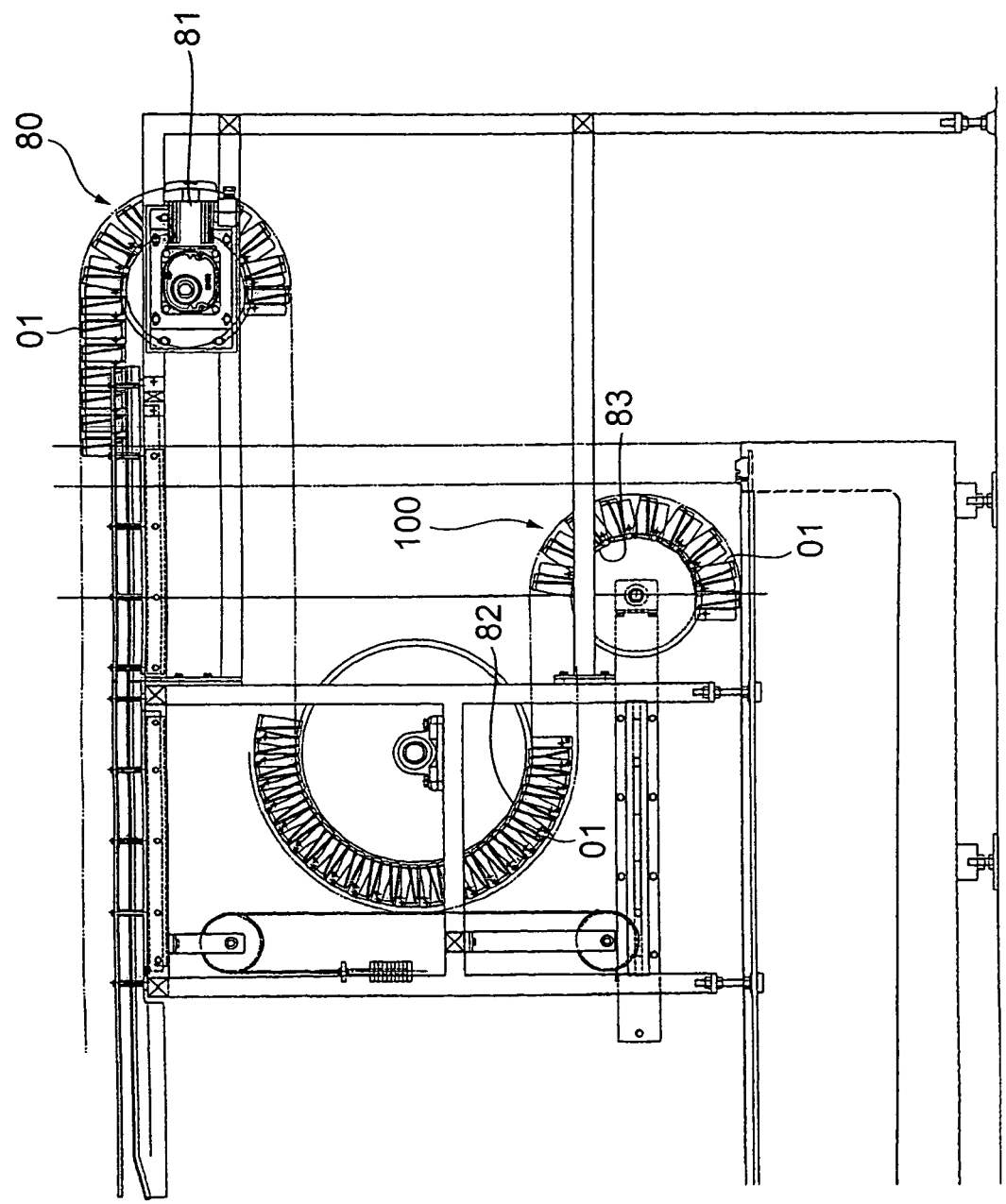
FIG. 10 is an enlarged detail of the part Q in FIG. 6.
Figure 17:
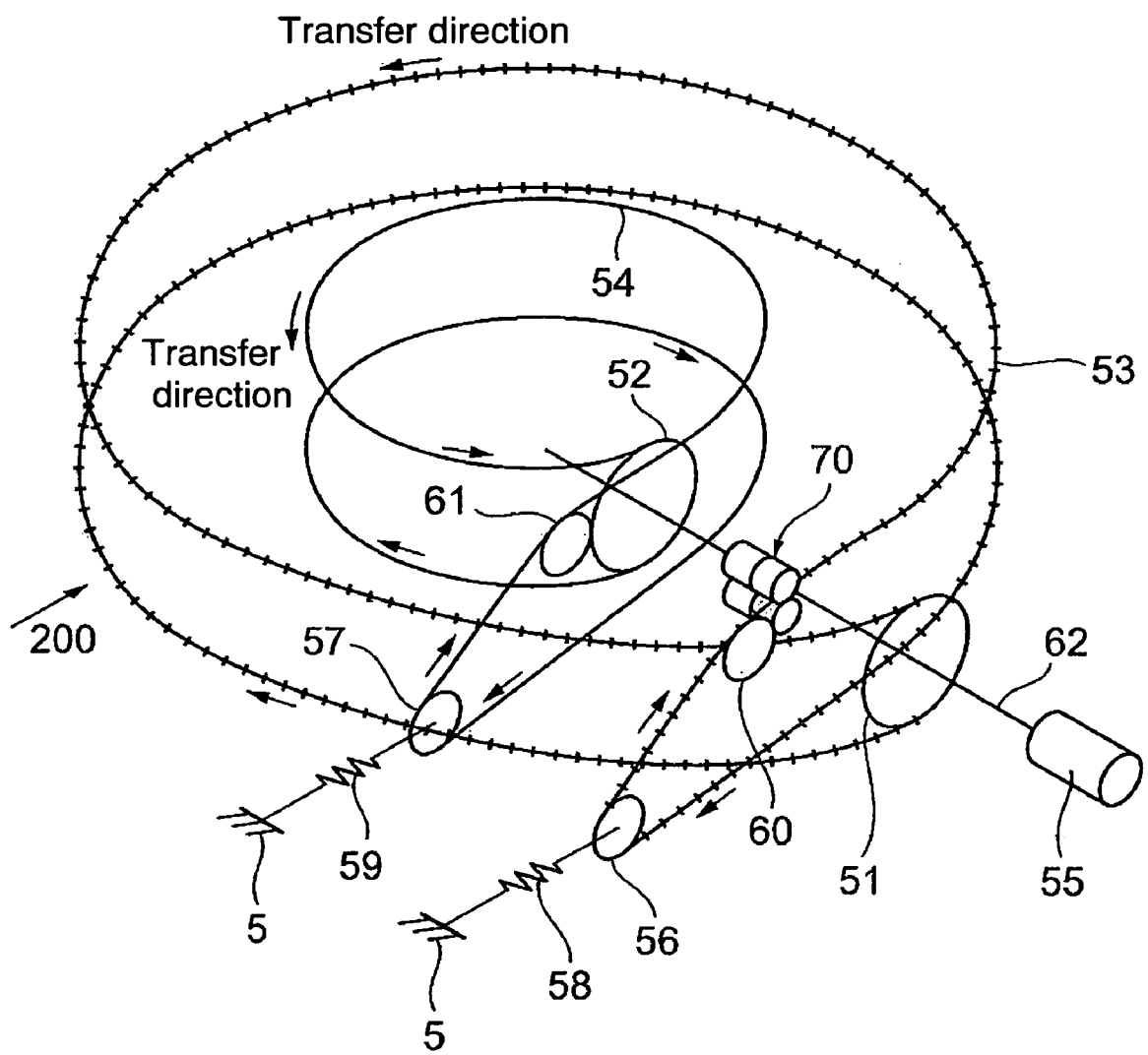
FIG. 17 is a schematic representation for explaining the driving apparatus of the transfer conveyer.
Figure 18:
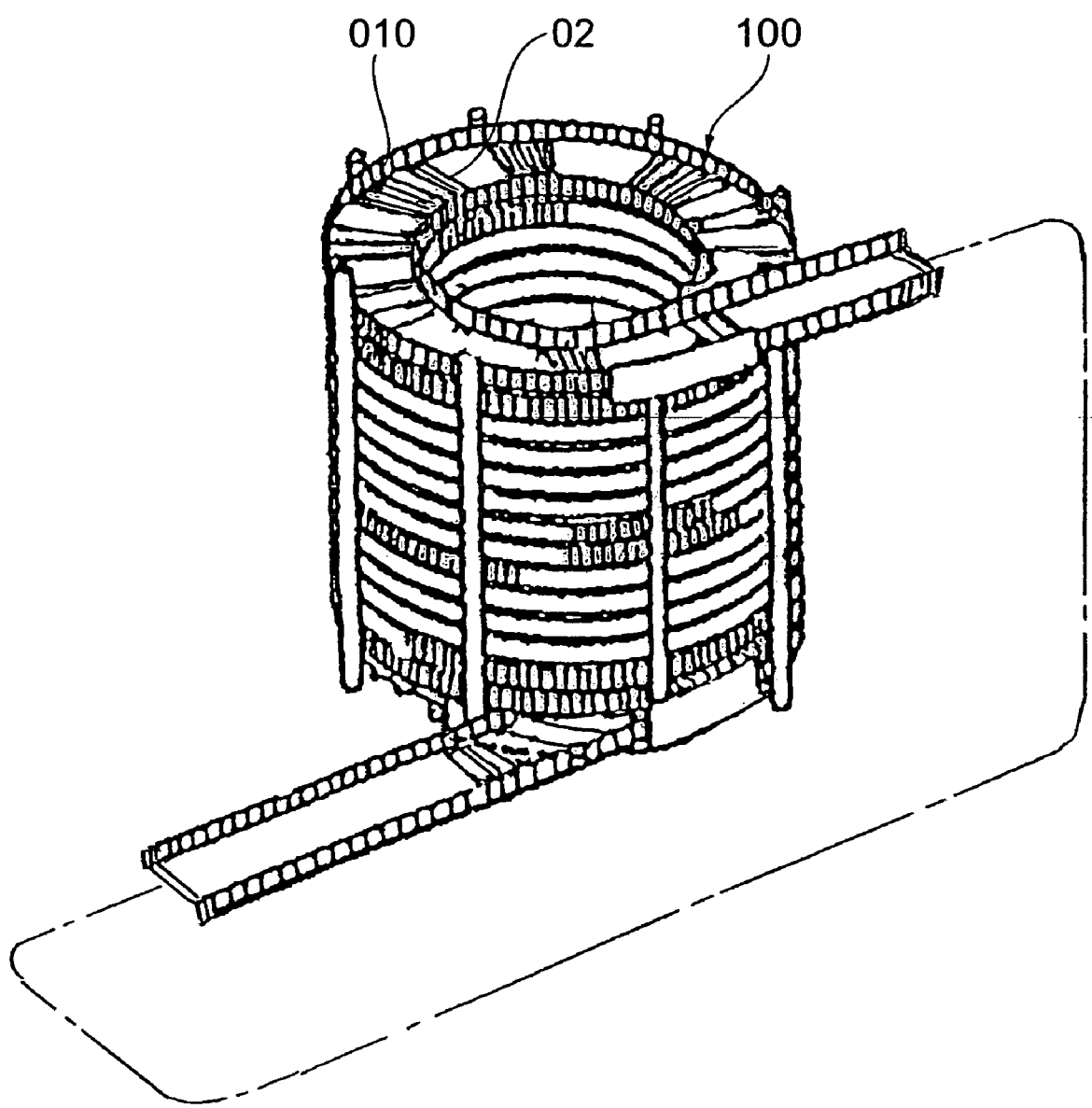
FIG. 18 is a perspective view of the spirally piled portion of the transfer conveyer of prior art.

Referring to FIGS. 6, 9, and 17, reference numeral 57 is a tension pulley for the inside chain 54, and 56 is a tension pulley for the outside chain 53. The inside chain 54 is looped over the tension pulley 57 and the outside chain 53 is looped over the tension pulley 56. Each of the tension pulleys 57, 56 is pulled respectively by tension springs 59, 58 provided between each of the tension pulleys 57, 56 and the supporting frame 5 to tighten the chains.

By this, the inside chain 54 and outside chain 53, each of the chains being composed as an endless chain, is tightened properly to prevent the chain from loosening, and the transfer conveyer 100 can be steadily moved.

As shown in FIGS. 6, 9, and 17, the spacer members 1 of transfer conveyer 100 rise on the inside chain 54 and outside chain 53 after they passed over the tension pulley 57, 56 to be transferred to enter the spiral pile 201 via intermediate pulleys 61, 60 for guiding the inside chain 54 and outside chain 53 respectively.

When the transfer conveyer 100 enters the spiral pile 201, it leaves the inside chain 54 and outside chain 53 to move upward along the spiral, and the foodstuff on the connection members 2 which constitute the transfer passage in the spiral pile 201 is cooled by a refrigerating machine 25 located in the space inside the inner-side spiral.

The transfer conveyer 100 moved up the spiral pile 201 advances horizontally at the top thereof to reach the way-out portion 100b.

At the way-out portion, the spacer members 1 of the transfer conveyer 100 are engaged with a sprocket 83 of an auxiliary driving apparatus 80 and auxiliary driving force is added to the transfer conveyer 100. As shown in FIG. 7, a pair of sprockets 83 connected by a sprocket shaft 84 is rotated by an auxiliary motor 81 in the auxiliary driving apparatus 80 to apply the auxiliary driving force to the transfer conveyer via the spacer members 1.

Therefore, by composing like this, additional driving force is applied by the auxiliary driving apparatus 80 to the transfer conveyer which is driven by the driving force applied to the inside chain 54 and outside chain 53 as mentioned later, and thus the transfer conveyer can be driven by increased driving force.

The transfer conveyer 100 added with the auxiliary driving force moves down looping over an intermediate pulleys 82 and 83 located below the auxiliary driving apparatus 80 as is shown in FIG. 6, and advances horizontally in a horizontal portion 202 to be looped over a pulley of the entrance portion 110a to be turned in its advancing direction, and enters the refrigeration room 22.

Figure 11:
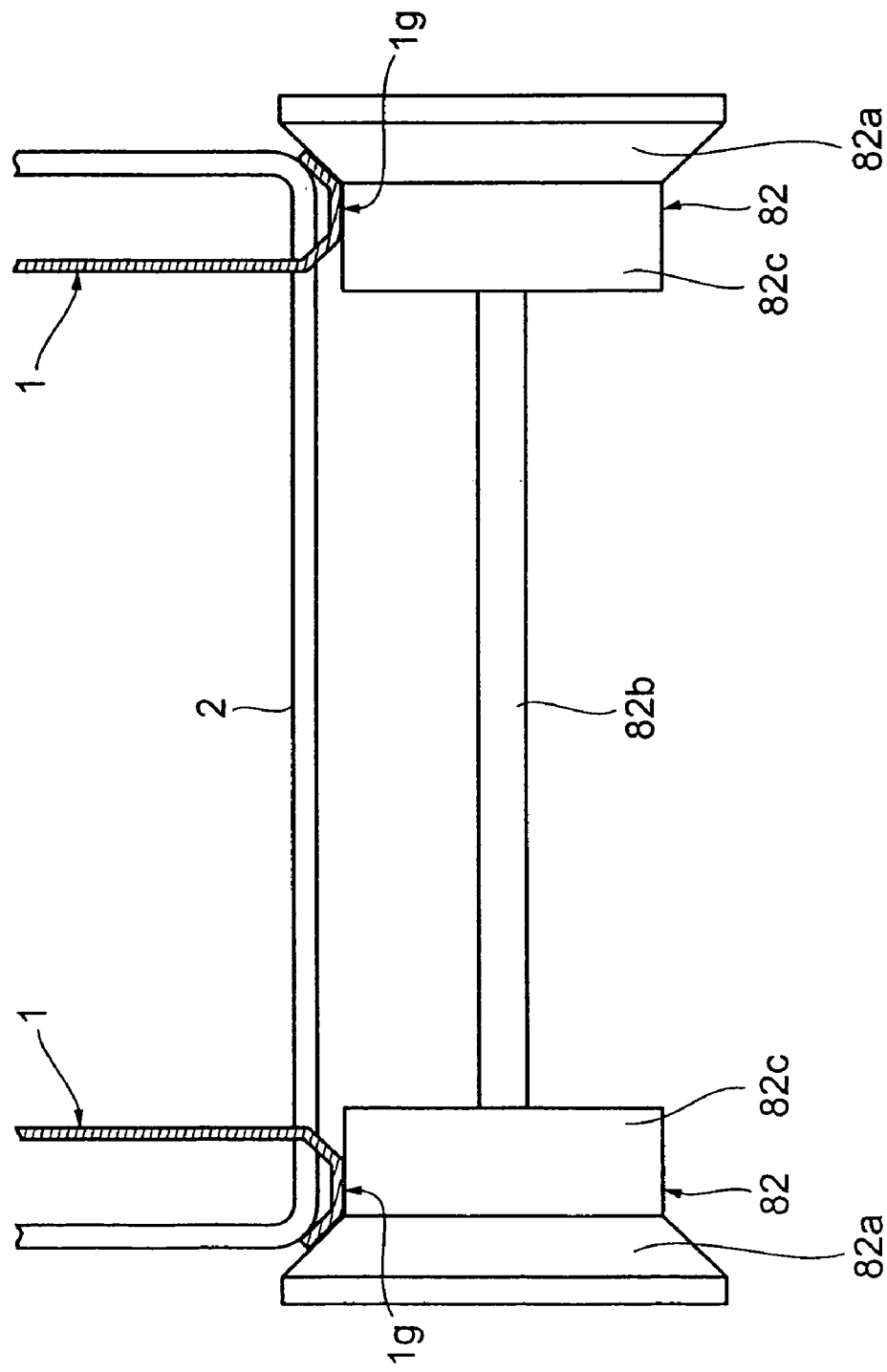
FIG. 11 is a sectional view along line V-V in FIG. 6.

Referring to FIG. 11 showing the detail of the intermediate pulley 82, the intermediate pulley 82 comprises a pair of pulleys, each having a cylindrical part 82c and a conical part 82a continuing to the cylindrical part 82c toward outside, the pulleys being connected by a connecting shaft 82b. Each of both side spacer members of the transfer conveyer 100 contacts each of the cylindrical part 82 as indicated by 1g.

By the composition like this, the foodstuff transferred on the connection members 2 can be transferred without contacting the intermediate pulleys 82.

The construction and operation of the driving apparatus 200 including the inside chain 54 and outside chain 53 will be explained later.

In the space 23 inside the spiral pile of the transfer conveyer 100 is installed a refrigerating machine 25 for cooling the foodstuff (frozen foodstuff) transferred on the transfer conveyer 100. The refrigerating machine 25 is composed to have plate type heat exchangers disposed radially in the embodiment, it is suitable to adopt heat exchangers of other type.

By composing like this, the inside space 23 formed inside the spiral pile of the transfer conveyer 100 is utilized as the space for installing the refrigerating machine 25, and a compact frozen foodstuff transfer system can be provided.

Referring to FIG. 1~4 showing the detail of the transfer piece 01 composing the first embodiment of the transfer conveyer according to the present invention, reference numeral 1 is a spacer member made of plate material. The spacer member 1 is formed to have an inside-part 1b and an outside-part 1a continuing to the inside-part 1b and offsetting from the inside-part 1b outward in lateral direction perpendicular to the transfer direction shown by arrow S in FIG. 1.

Figure 3:
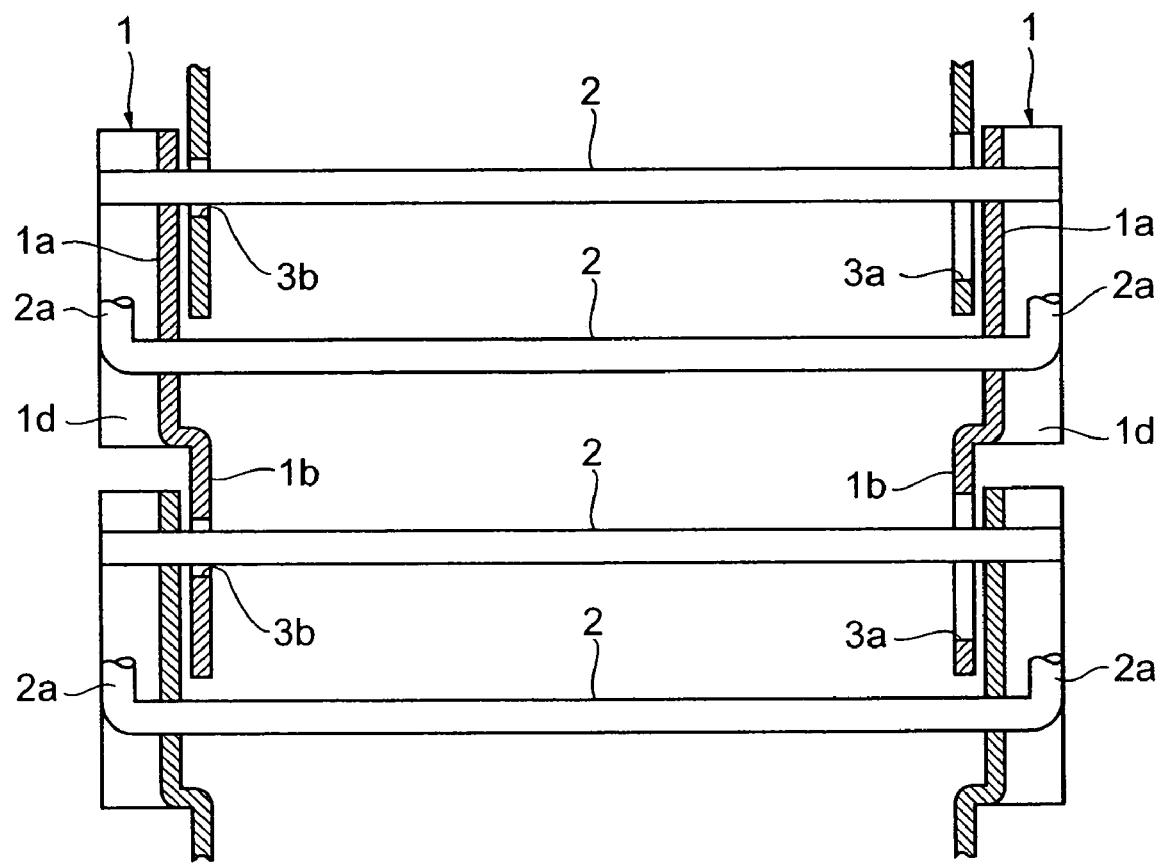
FIG. 3 is a sectional view along line B-B in FIG. 1.

The distance of the offset of the outside-part 1a from the inside-part 1b outward in lateral direction perpendicular to the transfer direction is determined so that the plate thickness of the inside-part 1b is accommodated in the space defined between the inside surface of the outside-part 1b and the extension of the inside surface of the inside-part 1b as shown in FIG. 3.

Figure 2:
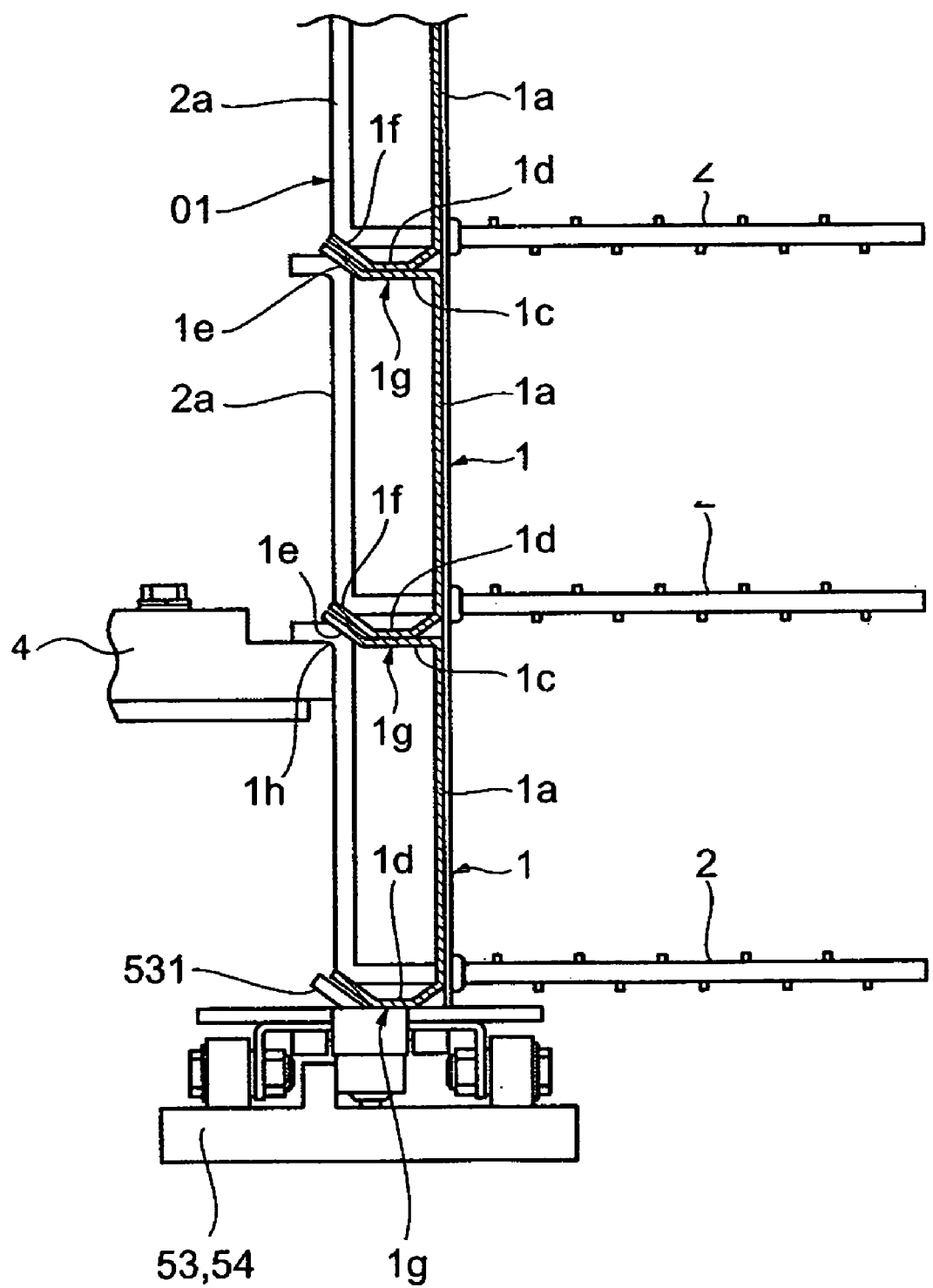
FIG. 2 is a view in the direction of arrow A in FIG. 1.

As shown in FIG. 2, the upper end part and lower end part of the outside-part 1a of the spacer member 1 are formed to have an engaging part 1c and 1d respectively extending outwardly having a contact face 1g perpendicular to the transfer direction, and each outer side end part of the engaging part 1c and 1d is bent to form an inclined face 1e and 1f inclined by a certain angle to the vertical direction.

Each of the transfer pieces 01 is piled in the spiral pile 201 such that the lower side engaging part 1d of a spacer member rises on the upper side engaging part 1c of the spacer member positioning right under said spacer member contacting at the contact face 1g as shown in FIG. 2.

Reference numeral 2 is a bar-like connection member. Each of both spacer members 1 is fixed to two connection members 2 (more than two may be permitted) at the lower end part of the outside-part 1a of each spacer member by for example by brazing to form a transfer piece 1.

Figure 1:
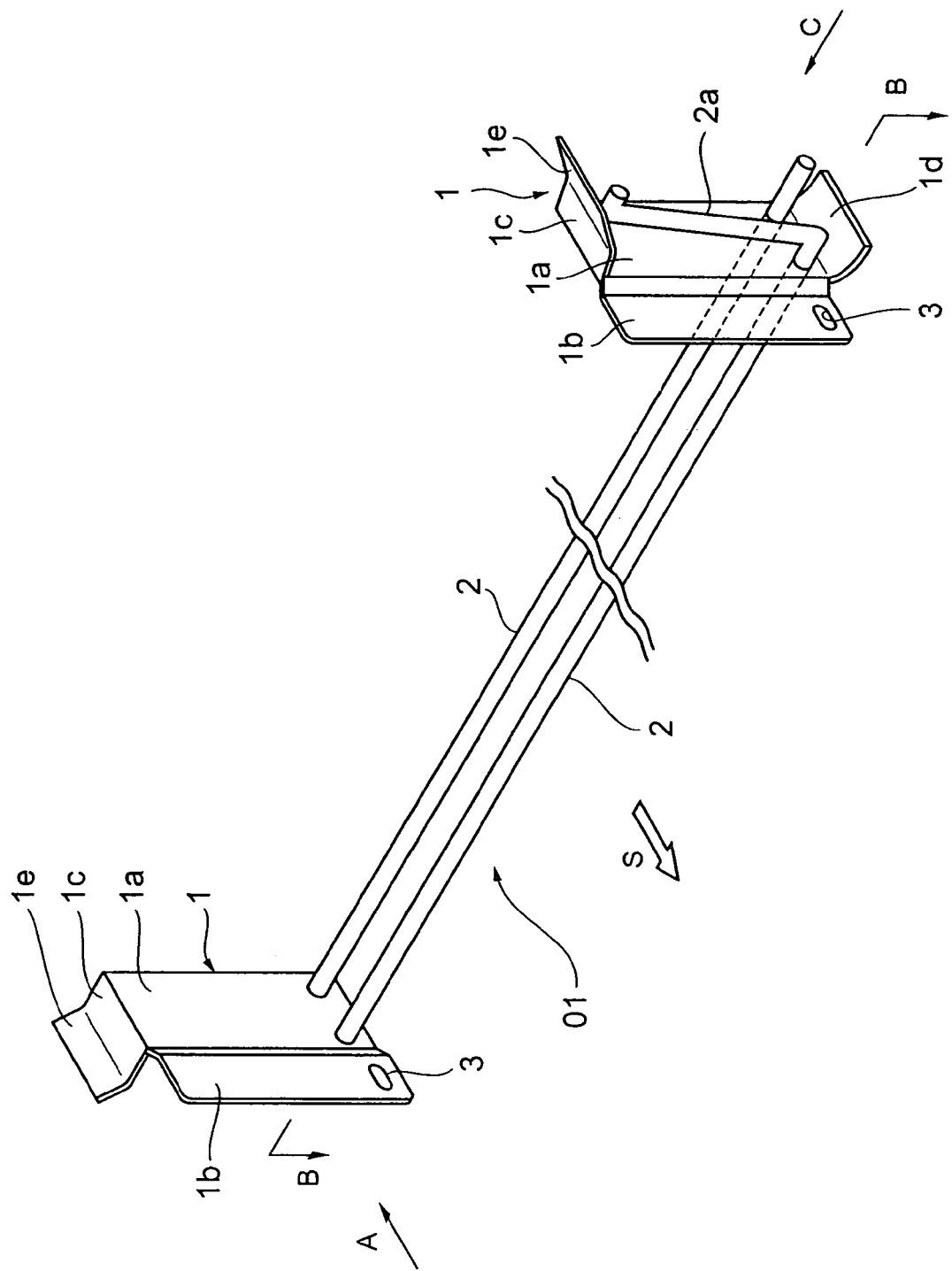
FIG. 1 is a perspective view of the transfer piece of the transfer conveyer of the first embodiment according to the present invention.
Figure 4:
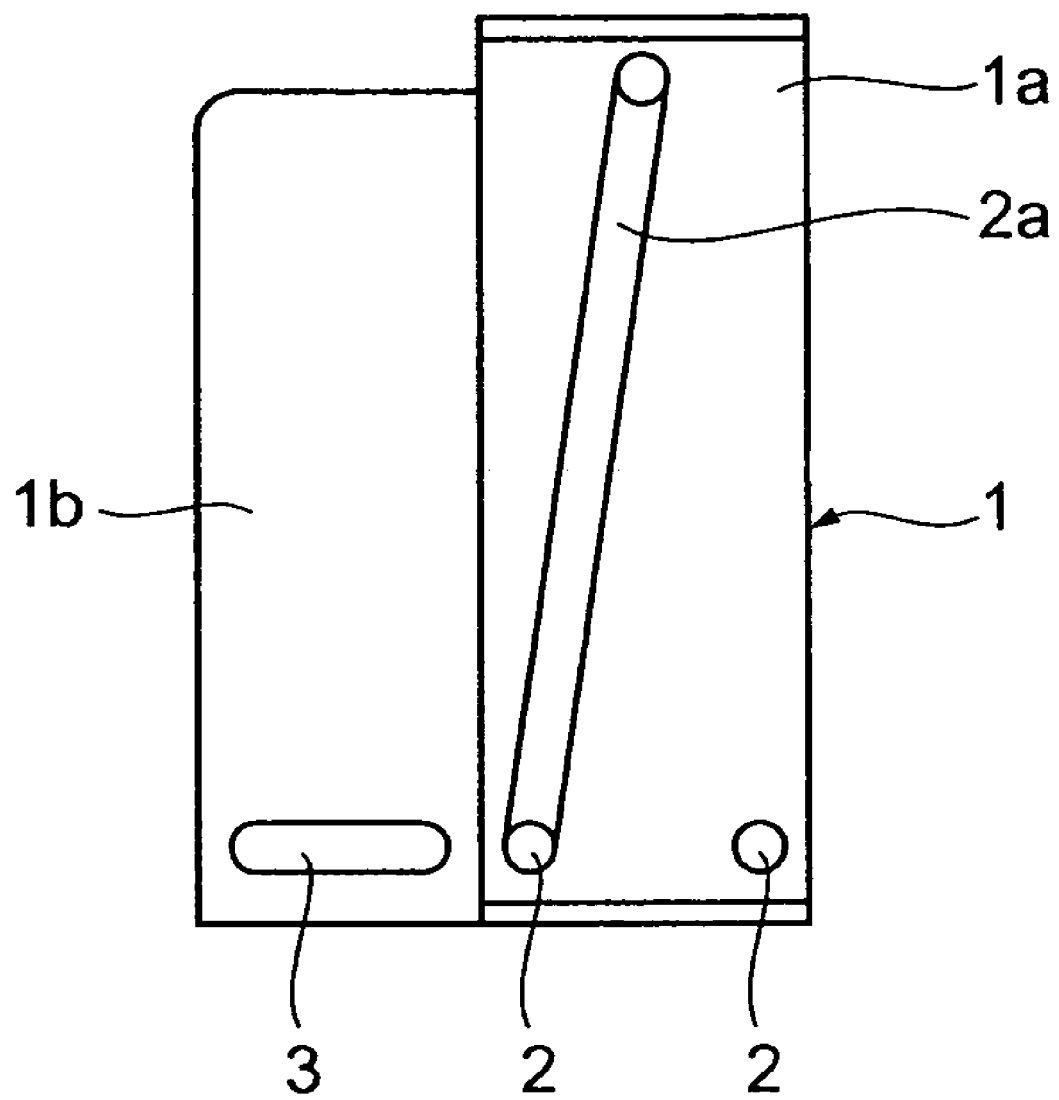
FIG. 4 is a view in the direction of arrow C in FIG. 1.

Referring to FIG. 1 and 4, reference numeral 3 is an oblong hole of a certain length made in the lower end part of the inside-part 1b of the spacer member along the transfer direction (direction shown by S in FIG. 1). Each of both end parts of one of the connection member 2 of the adjacent transfer piece 01 is passed through the oblong hole 3 of each of both spacer members 1 of the adjacent transfer piece 01 to connect the adjacent transfer piece 01. Thus transfer pieces 01 are connected to compose the endless transfer conveyer 100 for transferring articles such as foodstuff, etc. The transfer pieces 01 are movable relative to each other because said one of the connection members can move in said oblong holes 3. Accordingly, the transfer conveyer is flexible enabling the transfer conveyer to be piled vertically to form the spiral pile.

As shown in FIG. 1 and 2, each end side of one of the connection members 2 is extended beyond the part fixed to the spacer member 1 to form an extension part 2a bent upward obliquely and then bent toward outside laterally, and this outwardly bent end part is fixed for example by brazing to rear side of the inclined part 1e of each spacer member 1.

As shown in FIG. 2, the underside 1h of the outwardly bent end part of the extension part 2a contact the support member 4 fixed to the supporting frame 5, and the transfer conveyer 100 is guided along the guide face of the support member 4.

By composing like this, as both end sides of one of the connection member 2 is extended to form the guide parts 1h at both end parts thereof to guide the transfer conveyer 100, the transfer conveyer 100 can be advanced steadily without sideway movement, and there is no need to provide exceptional guide members to the transfer conveyer 100.

Further, by bending the end part of the extension part 2a of the connection member 2 to be fixed to the inclined part 1e of the spacer member 1, the spacer member is reinforced by the extension part 2a of the connection member against a vertical load. Therefore, the vertical load is born by the reinforced spacer member not by the connection member connecting the spacer members and constituting the transfer passage.

As is shown in FIG. 2, the transfer conveyer 100 composed of transfer pieces 01 as described in the foregoing rises on the support member 531 of the inside chain 54 or outside chain 53 by way of the lower end of the spacer members 1 and is advanced together with the advance of the inside chain 54 or outside chain 53.

As has been explained in the foregoing, according to the first embodiment of the invention, the spacer member 1 of the transfer piece 01 is formed to have an inside-part 1b and an outside-part 1a continuing to the inside-part 1b and offsetting from the inside-part 1b outward in lateral direction perpendicular to the transfer direction (indicated by arrow S in FIG. 1) of the article to be transferred such as frozen foodstuff, the upper end part and lower end part of the outside-part 1a of the spacer member 1 are formed to have an engaging part 1c and 1d respectively extending outwardly having a contact face 1g along the transfer direction, and a plurality of transfer pieces 01 are piled vertically by placing the lower side engaging part 1d of the transfer piece 01 positioned right above the upper side engaging part 1c of the transfer piece 01 positioned right under said transfer piece 01 to contact at the contact face 1g, so that a plurality of the transfer pieces 01 can be piled while the spacer members of the transfer pieces 01 coming into plane contact to each other. Therefore, the load exerting to each transfer piece 01 is supported by plane contact, and local increase in contact pressure is prevented resulting in increased wear resistant construction.

In addition to that the load exerting to the transfer pieces 01 is carried by the contact face 1g of the upper engaging part 1c and lower engaging part 1d, lateral movement of the transfer pieces 01 in lateral directions perpendicular to the transfer direction can be restrained by the engagement of the lower inclined face 1f with the upper inclined face 1e.

Further, as the vertically adjacent transfer pieces 01 contact to each other at the horizontal contact face 1g of the upper and lower engaging part 1c and 1d to form the spiral pile, there is not formed a pocket at the contacting portion of the transfer pieces 01 as is the case with the prior art, drainage of water when transferring frozen foodstuff is improved.

Figure 5:
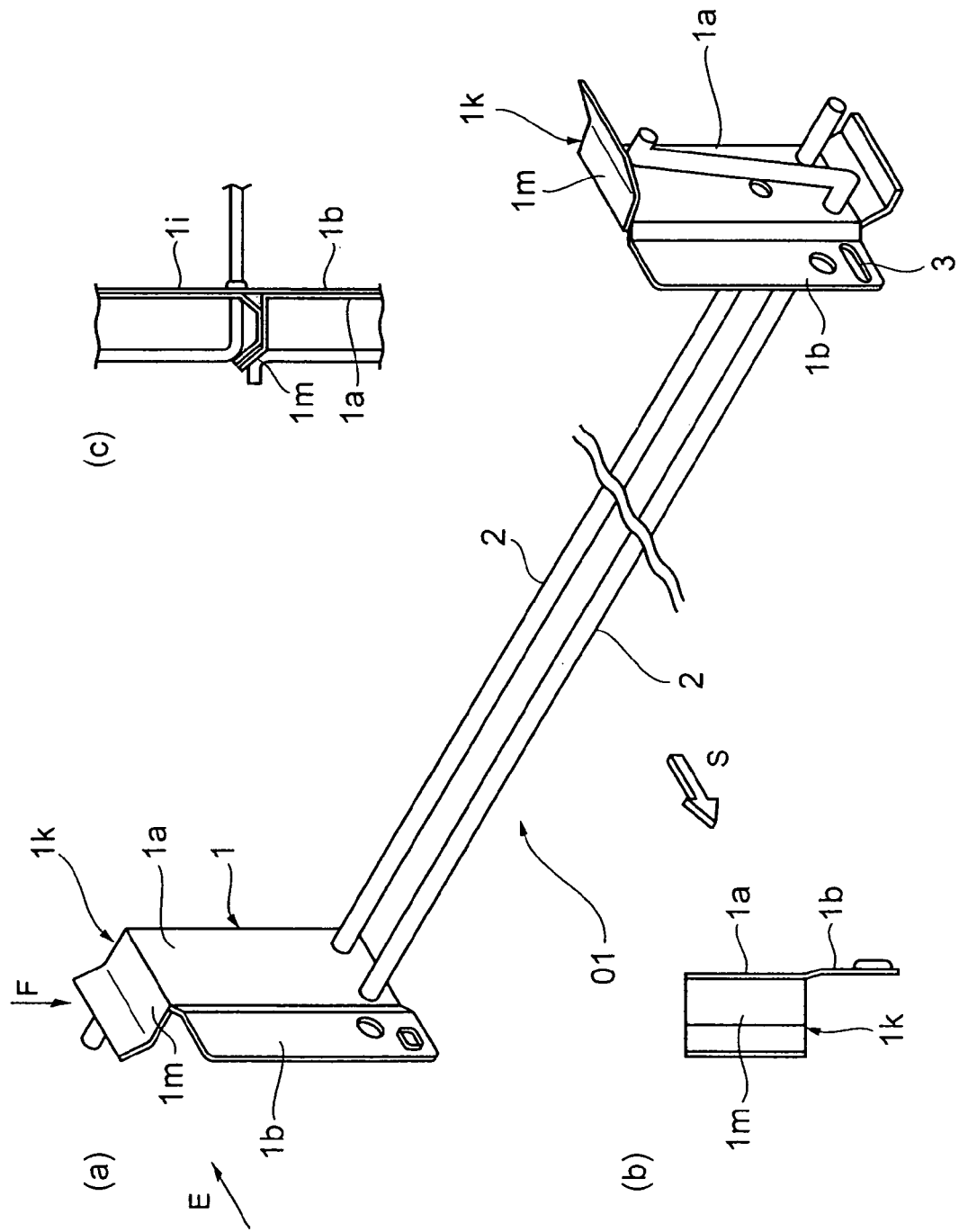
FIG. 5(a) is a perspective view of the transfer piece of the transfer conveyer of the second embodiment according to the present invention.
FIG. 5(b) is a view in the direction of F in FIG. 5(a)
FIG. 5(c) is a view in the direction of E in FIG. 5(a).

Next, referring to FIGS. 5(a), (b), and (c) showing the second embodiment of the transfer piece 01, the spacer member 1 is formed to have an outer-side part 1a and an inside-part 1b continuing to the outer-side part 1a and offsetting outward in lateral direction perpendicular to the transfer direction S, an engaging part 1k is formed at the upper or lower end part of the inside-part 1b and outer-side part 1a, the engaging parts bending oppositely to each other in lateral direction perpendicular to the transfer direction, so that the upper part and lower part of the spacer members 1 adjacent to each other in the vertical direction can contact with each other.

Each engaging part 1k of the inside-part 1b and outer-side part 1a has an inclined face 1m inclined by a certain angle to the vertical plate of the spacer member 1, the lower end part 1i of the vertically adjacent spacer member contacts the inclined face 1m. By this contact, the movement of the vertically adjacent spacer member in lateral directions perpendicular to the transfer direction is restrained.

In the second embodiment, each end part of the bar-like connection members 2 is fixed to the outside-part 1a of each of spacer members, an oblong hole 3 of a certain length is made in each of the inside-part 1b along the transfer direction S, and one of the connection members 2 is passed through the oblong holes 3 of the adjacent transfer piece 01 adjacent in the transfer direction so that the transfer pieces adjacent to each other are connected by the connection member in the state the transfer members 01 are movable relative to each other in the transfer direction.

According to the second embodiment, the flat spacer member 1 fixed to each of both end parts of the connection members 2 is formed to have an inside-part 1b and an outside-part 1b continuing to the inside-part 1b and offsetting from the inside-part 1b outward in lateral direction perpendicular to the transfer direction, an engaging part 1k bending in a lateral direction perpendicular to the transfer direction is formed at the upper end part of the inside-part 1b where the lower end part 1i of the spacer member positioned right above is allowed to contact, an engaging part 1k bending in a lateral direction perpendicular to the transfer direction but opposite to the direction of the engaging part formed at the upper part of the inside-part 1b is formed at the lower end part of the outside-part 1a where the upper end part of the spacer member positioned right under is allowed to contact, so that the upper end part or lower end part of each vertically adjacent spacer member contact at the engaging part 1k and each transfer piece does not laterally fluctuate in lateral directions perpendicular to the transfer direction.

Further, as the engaging part 1k is formed to have the inclined face 1m inclined by a certain angle to the flat face of the spacer member 1, the spacer members vertically adjacent to each other contact at the upper and lower end part of each vertically adjacent spacer members, and the occurrence of lateral movement (fluctuation) in lateral directions perpendicular to the transfer direction between each spacer member is positively evaded.

Next, the driving apparatus 200 for driving the transfer conveyer 100 will be explained hereunder.

Figure 13:
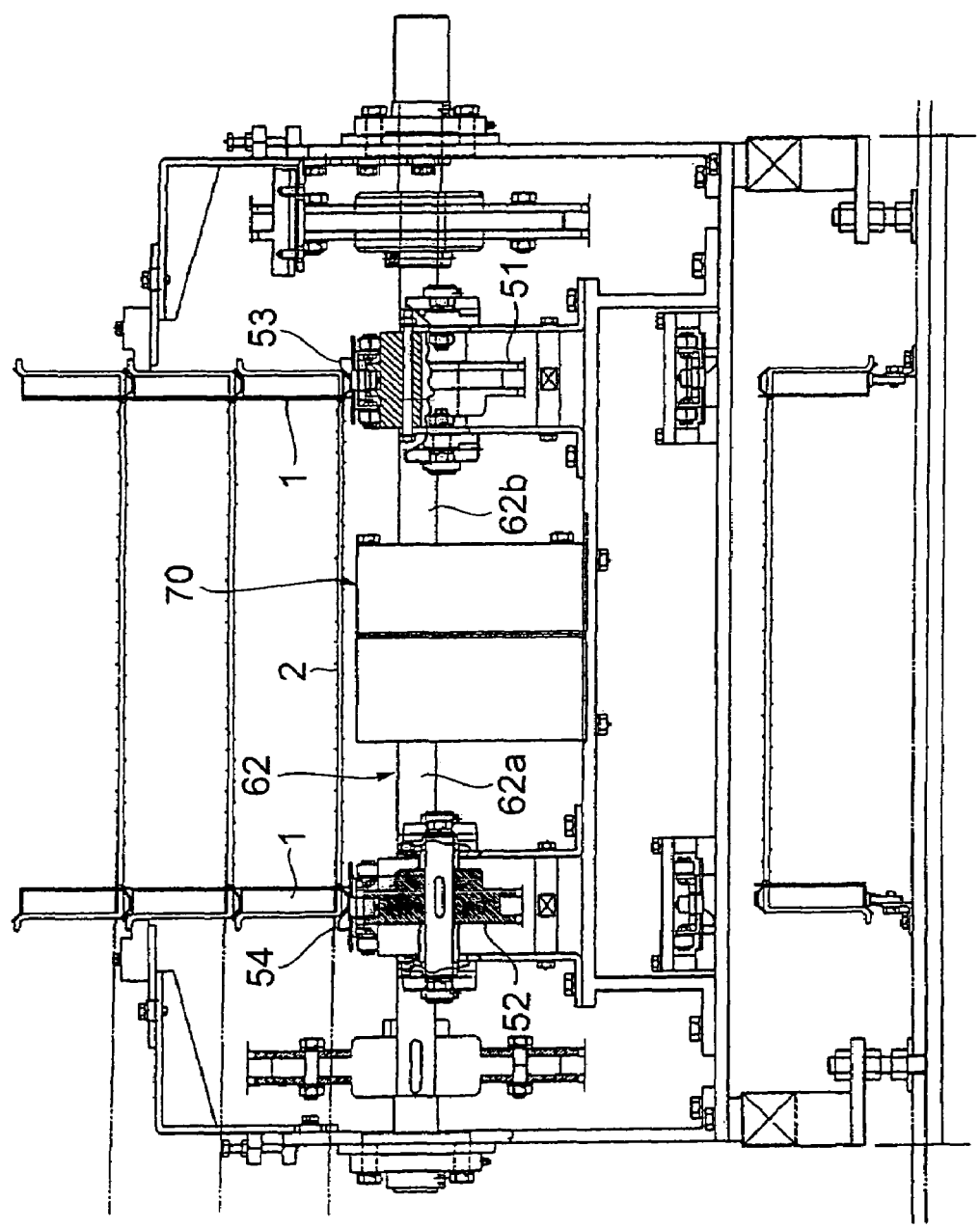
FIG. 13 is a sectional view along line P-P in FIG. 6.

FIG. 17 is a schematic representation of the driving apparatus 200. In the drawing, reference numeral 54 is an inside chain, which allows the one side of the pair of spacer members of the transfer piece 01 to rise thereon to be advanced together with the chain, as is shown in FIG. 13 and FIG. 9. Reference numeral 53 is an outside chain, which allows the another side of the pair of spacer members of the transfer piece 01 to rise thereon to be advanced together with the chain, as is shown in FIG. 13 and FIG. 9.

Reference numeral 52 is an inside sprocket over which the inside chain 54 is looped, and 51 is an outside sprocket over which the outside chain 53 is looped. Reference numeral 62 is a drive shaft connected to the inside sprocket 52 and outside sprocket 51, 70 is a speed change gear drive connected to the drive shaft 62 in between the inside sprocket 52 and outside sprocket 51, and 55 is a motor connected to the drive shaft 62.

Reference numeral 57 is a tension pulley for the inside chain 54, 56 is a tension pulley for the outside chain 53, 59 and 58 are tension springs provided between the tension pulley 57, 56 and the supporting frame 5 to pull the tension pulley 57, 56 respectively to exert tension, 61 and 60 are intermediate pulleys to guide the inside chain 54 and outside chain 53. (The working of the tension pulleys 57 and 56, tension springs 59 and 58, and intermediate pulleys 61 and 60 has already been explained before.)

Figure 8:
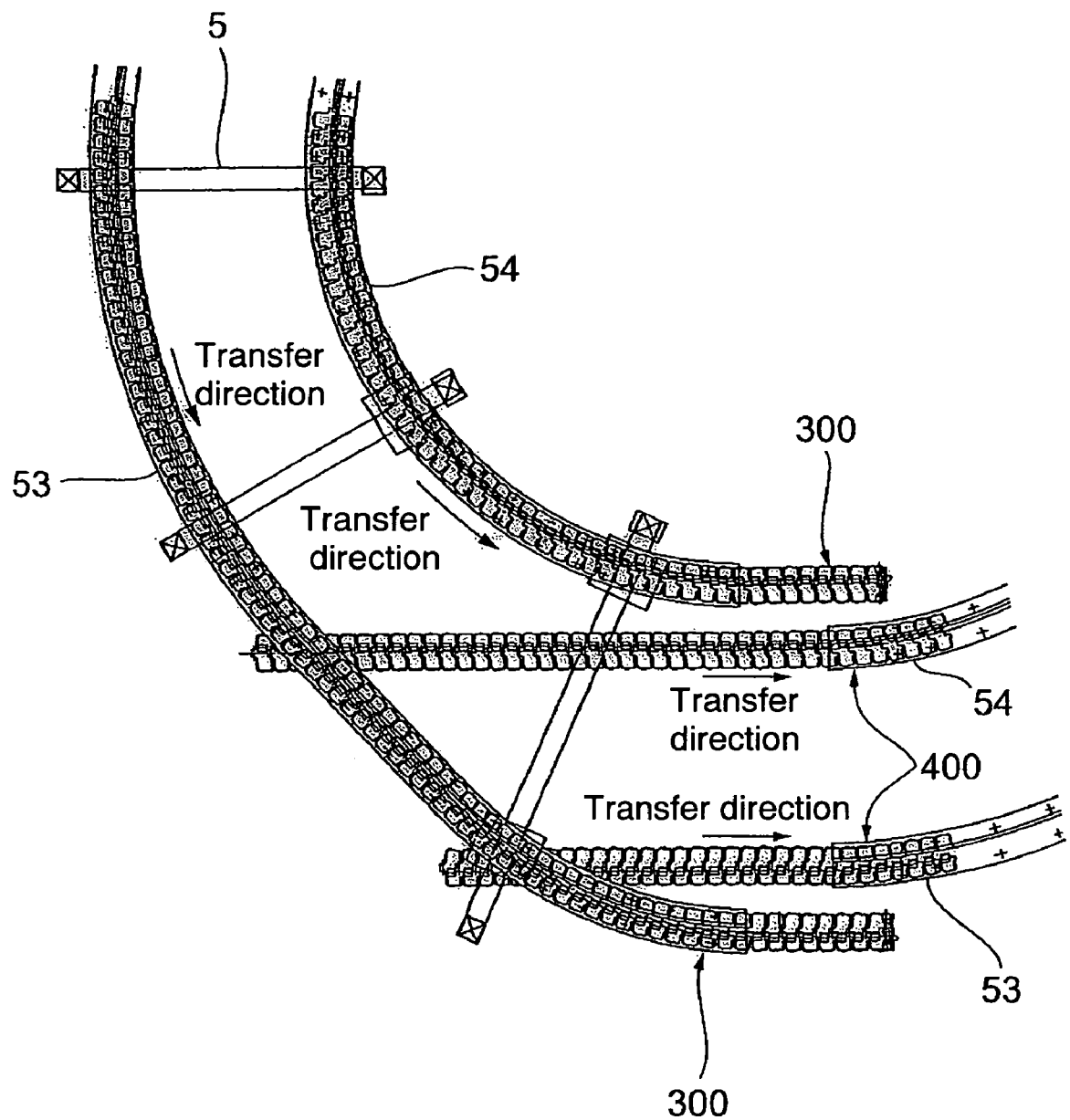
FIG. 8 is an enlarged detail of the part S in FIG. 7.

The inside chain 54 and outside chain 53 are disposed as shown in FIG. 8 such that the chains advancing at the entrance portions 300, where the spacer members 1 of the transfer conveyer 100 rise on the chains, do not interfere with the chains advancing at the way-out portions 400 located after the spacer members leave the chains by offsetting the passages of the chains vertically.

Each of the inside chain 54 and outside chain 53 has a plurality of roller assemblies arranged along the transfer direction S as shown in FIGS. 16(A) and (B). Each roller assembly has a supporting part 531 for allowing the spacer members 1 of the transfer conveyer 100 to rise thereon with the contact face 1g of the spacer member 1 of the transfer conveyer 100 contacting the surface thereof and left and right rollers 532. Each chain is composed as a top chain laterally movable in the directions perpendicular to the transfer direction of the transfer conveyer 100.

By composing like this, the transfer pieces of the transfer conveyer 100 can be transferred to be moved laterally freely, and the spiral piling of the transfer conveyer 100 is easy.

Figure 14:
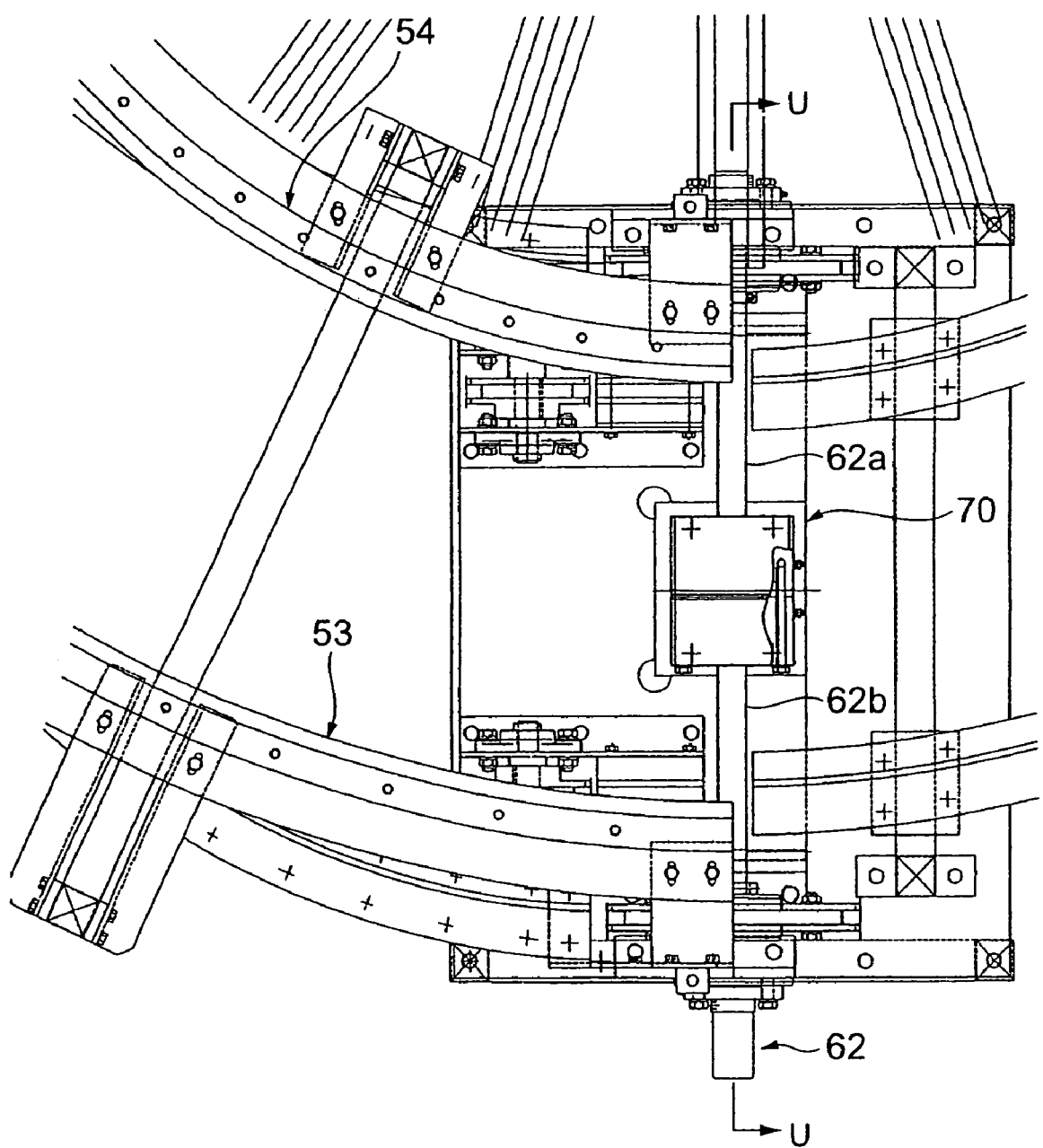
FIG. 14 is an enlarged detail of the part R in FIG. 7.
Figure 15:
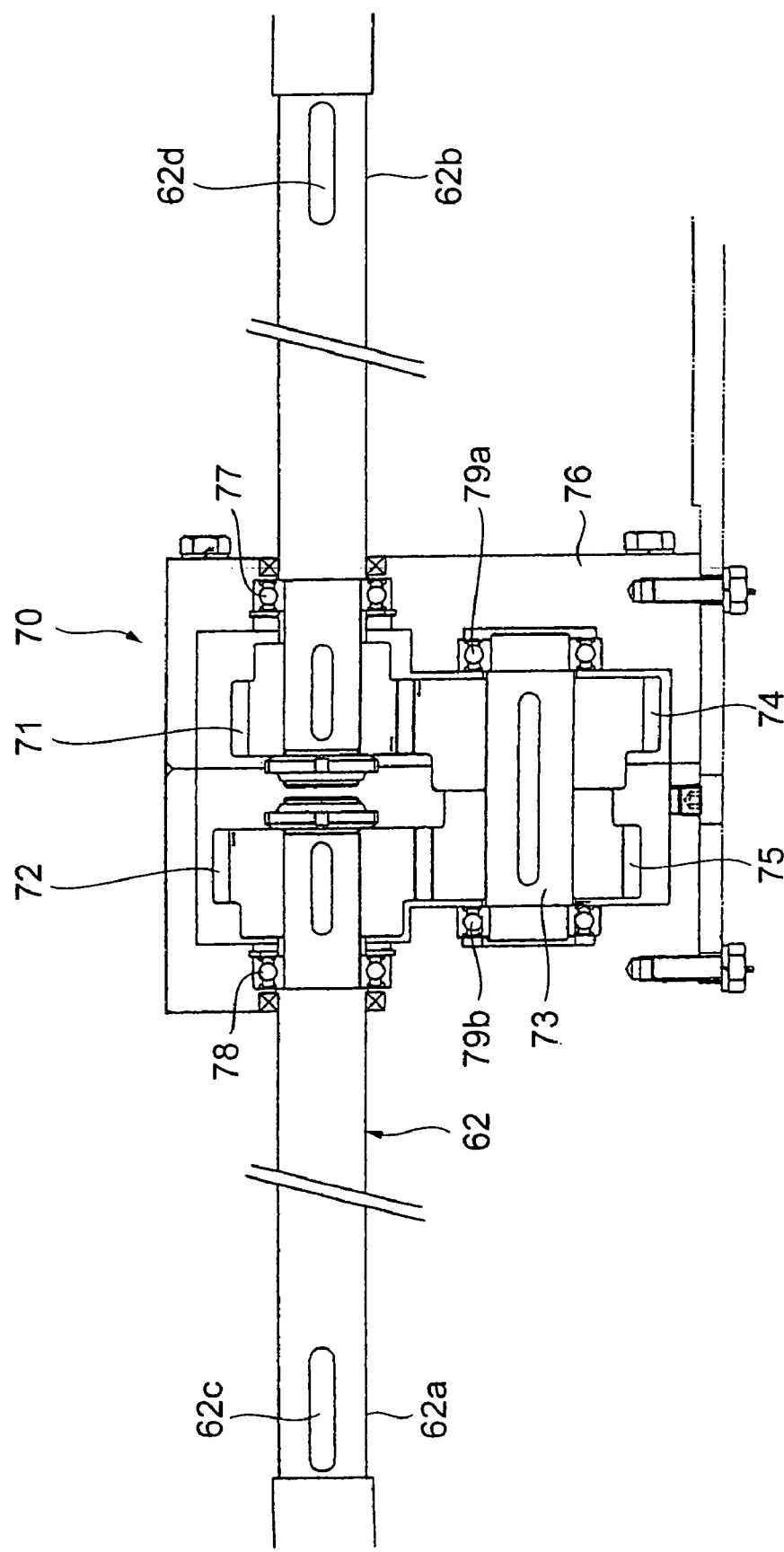
FIG. 15 is a sectional view along line U-U in FIG. 14.

Referring to FIG. 13-15, the drive shaft 62 is divided into an outside drive shaft 62b and an inside drive shaft 62a in the speed change gear drive 70. The rotation speed of the inside sprocket 52 is reduced to be slower than that of the outside sprocket 51 so that the inside chain 54 advancing with a smaller curvature radius and the outside chain 53 advancing with a larger curvature radius rotate with the same angular velocity.

Figure 12:
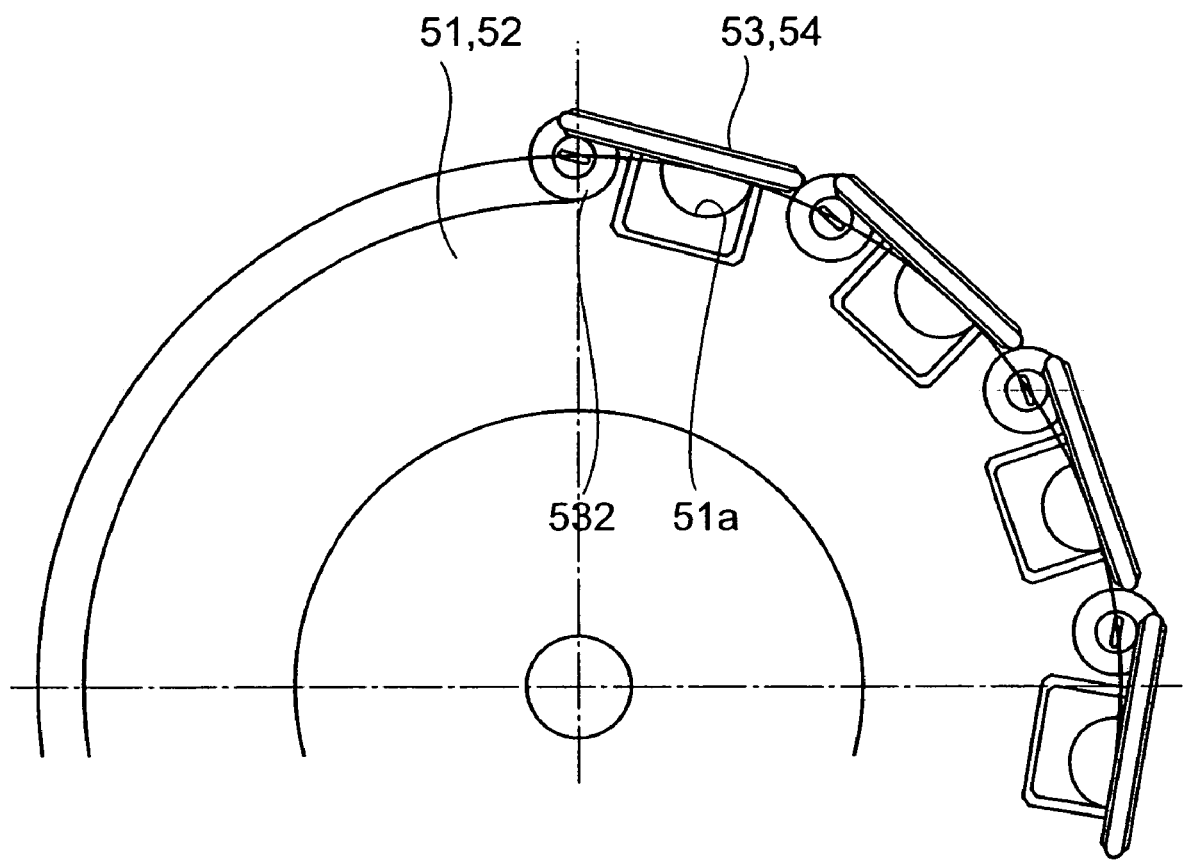
FIG. 12 is an enlarged detail of the part W in FIG. 9.

Referring to FIG. 12 showing the detail of the inside sprocket 52 and outside sprocket 51, grooves 51a are formed on the outer periphery of the inside sprocket 52 and outside sprocket 51, the rollers 532 of the inside sprocket 52 and outside sprocket 51 engage with every other groove 51a sequentially.

Referring to FIG. 15, the outside drive shaft 62b has a key 62d in one side(outer side) thereof for fixing the outside sprocket 51 and the motor 55 is connected at the outer side end thereof. At the other end (inside end) of the outside drive shaft 62b is fixed a outside gear 71 of the speed change gear drive 70.

An inside gear 72 of the speed change gear drive 70 is fixed to one end of the inside drive shaft 62a, and the inside sprocket 52 is fixed to the other end side (inner side) by means of a key 62c.

Reference numeral 73 is an idler shaft to which are fixed an outer side intermediate gear 74 meshing with the outer side gear 71 and an inner side intermediate gear 75 meshing with the inner side gear 72. The ratio of the number of teeth of the inside gear 72 which is connected to the inside sprocket 52 to that of the outside gear 71 which is connected to the outside sprocket 51 (27 to 22 in this example) is determined to coincide with the ratio of the curvature radius of the rout of the outside chain 53 at the outside sprocket 51 to that of the inside chain 54 at the inside sprocket 52.

Reference numeral 76 is a gear casing, 77 and 78 are bearings to support for rotation the outsider drive shaft 62b and inside drive shaft 62a by the gear casing 76.

The rotation axes of the inside sprocket 52, outside sprocket 51, drive shaft to the end of which the motor 55 is connected, and the speed change gear drive are disposed parallel to the connection members 2.

By composing as described in the foregoing, the inside chain 54 and outside chain 53 composed to be an endless chain respectively are looped respectively over the inside sprocket 52 and outside sprocket 51 connected to the drive shaft 62 and driven by a single motor 55, and the speed change gear drive 70 is connected to the drive shaft 62 between the inside sprocket 52 and outside sprocket 51 so that the rotation speed of the inside sprocket 52 is reduced to be slower than that of the outside sprocket 51, so that the inside chain 54 and outside chain 53 composed as an endless chain respectively can be driven by a single motor 55 and the inside chain 54 and outside chain 53 to be driven with advancing speed different to each other because of difference in curvature radius can be smoothly advanced without inducing unreasonable force.

Further, as the rotation axes of the drive shaft to drive the inside chain 54 and outside chain 53, that is, the rotation axes of the inside sprocket 52, outside sprocket 51, drive shaft 62 to the end of which is connected the motor 55 and the rotation center speed change gear rive 70 are disposed horizontal and parallel to the connection members of the transfer conveyer 100, the motor 55 connected to the end of the drive shaft 62 is disposed parallel to the transfer conveyer 100, and the height of the driving apparatus is substantially lowered compared with the prior art in which the motor is installed vertically. In addition, maintainability of the apparatus is increased, for the speed change gear drive 70 and motor 55 are installed horizontally.

As the driving apparatus 200 is composed as mentioned above, pairs of spacer members 1 fixed to both end sides of the connection members 2 constituting the transfer passage of articles including foodstuff ride on the inside chain 54 and outside chain 53 driven by a single motor 55 via the drive shaft 62 with the contact face 1g which runs parallel to the transfer direction formed at the lower end of each spacer member 1 contacting each chain, and the transfer pieces 01 having enough strength riding on the inside chain 54 and outside chain 53 driven by the motor 55 are advanced by the contact of the transfer pieces with the inside chain 43 and outside chain 53.

The transfer conveyer 100 run out of the spiral pile 201 is returned to the entrance part 10a to be ridden on the inside chain 54 and outside chain 53 looping over the intermediate pulleys 82, 83, whereby the pair of spacer members 1 fixed to both end sides of the connection members 2 constituting the transfer passage contact the outer peripheries of the pulleys.

Therefore, the connection members 2 constituting the transfer passage do not contact the driving components all over its length and sanitary transfer of foodstuff is possible. As the transfer conveyer 100 is driven by the contact of the spacer members 1 formed to have enough rigidity with the drive chains, the transfer conveyer 100 can be advanced steadily.

INDUSTRIAL APPLICABILITY

According to the present invention, a plurality of transfer pieces can be piled vertically by forming an upper engaging part and a lower engaging part at the upper and lower end part of the outside-part of a spacer member and allowing the lower engaging part of a spacer member positioned in an upper side of the spiral to ride on the upper engaging part of a spacer member positioned right under said upper side positioned spacer. Therefore, the load exerting to each transfer piece is supported by plane contact, and local increase in contact pressure is prevented resulting in increased wear resistant construction compared with the case of prior art in which the vertical load is born by line contact.

Further, as has been mentioned, the load exerting to the transfer pieces is carried by plane contact of the vertically adjacent spacer members of the transfer pieces and lateral movement of the spacer members in lateral directions perpendicular to the transfer direction is restrained by the outwardly inclined parts of the engaging parts of the outside-part of the spacer member.

By this, the transfer pieces are steadily kept in vertical position by the plane contact and the occurrence of lateral movement of the transfer piece in lateral directions perpendicular to the transfer direction is prevented by the inclined part. Therefore, a vertical spiral pile of the transfer conveyer composed by connecting the transfer pieces can be formed while keeping good stability.

Therefore, according to the present invention, it is not needed to form engaging parts to the lower end part of both the inside-part and outside-part of the spacer member such that one is bent for example outward and the other is bent oppositely inward, but the engaging part having a horizontal face and an inclined face is formed at the upper and lower end side of only the outside-part of the spacer member to obtain a transfer conveyer having the feature as mentioned above.

By this, the structure of the spacer member is simplified resulting in a decreased processing man-hour, and manufacturing cost of the transfer conveyer and further the manufacturing cost of a refrigeration system integrating the transfer conveyer can be reduced. The transfer conveyer can be used as a downward advancing conveyer in the spiral portion without particular doctoring.

Further, according to the invention, a transfer conveyer having required feature can be obtained by providing an engaging part inclining to a lateral direction perpendicular to the transfer direction at the upper end part of either of the inside-part or outer-side of the spacer member and an engaging part inclining toward the lateral direction contrary to that the engaging part inclining at the lower end part of the other of the inside-part or outer-side of the spacer member. By this configuration, the structure of the spacer member is simplified resulting in a decreased processing man-hour, and manufacturing cost of the transfer conveyer and further the manufacturing cost of a refrigeration system integrating the transfer conveyer can be reduced.

Further, a transfer conveyer flexible in the transfer direction can be obtained by enabling the transfer pieces to move relative to each other in the transfer direction by simple construction that both end parts of the bar-like connection members are fixed to the inside-part of the pair of spacer members and one of the connection members is fitted loosely in the oblong holes each made in the inside-part of each spacer member to be able to move relative to the holes, and the manufacturing cost of the transfer conveyer is reduced.

According to the invention, the inner side spacer members and outer side spacer members fixed to the connection members constituting the transfer passage contact the drive components such as the inside chain and outside chain, etc., and the inner side spacer members and outer side spacer members contact the outer peripheries of the guide pulleys while the transfer conveyer runs between the way-out of the spiral and entrance to the spiral.

Therefore, the connection members constituting the transfer passage do not contact the driving components all over its length and sanitary transfer of foodstuff is possible. As the transfer conveyer is driven by the contact of the spacer members formed to have enough rigidity with the drive chains, the transfer conveyer can be advanced steadily.

According to the invention, as the inside chain and outside chain are driven by a single motor and the inner side spacer members and outer side spacer members of the transfer conveyer can be moved with a proper speed ratio simultaneously by a single motor, the structure of the of the transfer conveyer becomes simple, and it becomes possible to install the motor outside the insulated room and connect the motor to the driving device to drive the transfer conveyer by means of the drive shaft. As a result, sanitary operation can be maintained.

Further, as the rotation axes of the drive shafts of the speed change gear drive to drive the inside chain and outside chain are disposed horizontal and parallel to the connection members of the transfer conveyer, the motor connected to the end of the drive shaft is installed horizontally, i.e. parallel to the transfer conveyer, and the height of the driving apparatus is substantially lowered compared with the prior art in which the motor is installed vertically. In addition, maintainability of the apparatus is increased, for the speed change gear drive and motor are installed horizontally.

The invention claimed is:

1. A flexible foodstuff transfer installation comprising:
   a transfer conveyer for transferring foodstuff, accommodated in a refrigeration room formed by a heat insulated room, and
   a plurality of transfer pieces, each comprising a pair of erect spacer members made of plate material having an inside-part and outside-part, the erect spacer members connected to both end sides of connection members that constitute a transfer passage of articles including foodstuff, the erect spacer members being connected to each other so as to be capable of moving in the direction of transfer relative to each other,
   wherein a contact face bending outward is formed at both of upper and lower ends of the spacer member so that said transfer pieces comprising said pair of spacer members made of plate material can be piled in a vertical spiral by allowing an upper side positioned spacer member to rise on a spacer member positioned right under said upper side positioned spacer member via said bending contact face,
   wherein a refrigerating machine having plate type heat exchangers disposed radially is installed in a space inside the spiral of the transfer conveyer for flowing cold heat radially outwardly to cool the foodstuff transferred on the transfer conveyer,
   wherein said pair of spacer members are formed to have the outside-part and the inside-part continuing to the outside-part and offsetting outward in a lateral direction perpendicular to the transfer direction, and the distance of the offset of the outside-part from the inside-part in the lateral direction perpendicular to the transfer direction is determined so that the plate thickness of the inside-part is accommodated in the space defined between an inside surface of the outside-part and an extension of an inside surface of the inside-part when the transfer pieces are moved relative to each other.

2. The flexible foodstuff transfer installation according to claim 1,
   wherein an inside chain to allow one of the pair of the spacer members riding on the inside chain to move together with the inside chain and an outside chain to allow the other of the pair of the spacer members riding on the outside chain to move together with the outside chain are provided, the inside chain being driven by a single motor via a drive shaft, and
   wherein said inside chain and outside chain are looped respectively over an inside sprocket and an outside sprocket at an entrance of the spiral to allow the transfer pieces to be advanced to the spiral, the drive shaft of the inside sprocket and the outside sprocket extending to the outside of the heat insulated room to be connected to the drive motor located outside the heat insulated room.

3. The flexible foodstuff transfer installation according to claim 1, wherein a speed change gear drive is mounted in a drive shaft located at an entrance of the spiral, and the ratio of number of teeth of the inside gear connected to the inside sprocket to that of the outside gear connected to the outside sprocket is determined to coincide with the ratio of the curvature radius of the outside chain at the outside sprocket to that of the inside chain at the inside sprocket.

4. The flexible foodstuff transfer installation according to claim 1, wherein said inside chain and outside chain are composed to be curved chains deformable in lateral direction perpendicular to the direction along the transfer direction of the transfer passage.

5. The flexible foodstuff transfer installation according to claim 1, wherein are provided tension pulleys each to be looped over by the inside chain and outside chain at an upstream of the transfer direction from an entrance of the spiral, the inside chain and outside chain, at the other side, being looped over and inside sprocket and an outside sprocket each connected to a drive shaft, and tension springs each to pull each tension pulley for tensioning the chains in a tangential direction to the spiral.

6. The flexible foodstuff transfer installation according to claim 1, wherein a way-out portion of the transfer conveyer is disposed at one side of the heat insulated room provided with the refrigerating machine so that the transfer conveyer extends to be looped over sprockets at an outside of the heat insulated room, and the transfer conveyer also extends to an outside of the heat insulated room from an entrance portion of the heat insulated room opposite of the way-out portion to the looped over sprockets at the outside of the heat insulated room, and wherein one pair of the sprockets is connected to an auxiliary motor.

* * * * *